(12) United States Patent
Hayakawa

(10) Patent No.: US 9,979,489 B2
(45) Date of Patent: May 22, 2018

(54) OPTICAL MODULATION APPARATUS, OPTICAL TRANSMITTER AND CONTROLLING METHOD FOR OPTICAL MODULATOR

(71) Applicant: FUJITSU LIMITED, Kawasaki-shi, Kanagawa (JP)

(72) Inventor: Akinori Hayakawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/430,772

(22) Filed: Feb. 13, 2017

(65) Prior Publication Data

US 2017/0155451 A1 Jun. 1, 2017

Related U.S. Application Data

(62) Division of application No. 14/312,244, filed on Jun. 23, 2014, now Pat. No. 9,606,417.

(30) Foreign Application Priority Data

Jul. 18, 2013 (JP) .................................. 2013-149111

(51) Int. Cl.
*G02F 1/035* (2006.01)
*H04B 10/516* (2013.01)
(Continued)

(52) U.S. Cl.
CPC ......... *H04B 10/516* (2013.01); *G02F 1/0121* (2013.01); *G02F 1/0147* (2013.01);
(Continued)

(58) Field of Classification Search
None
See application file for complete search history.

(56) References Cited

U.S. PATENT DOCUMENTS

2004/0081386 A1   4/2004   Morse et al.
2013/0044973 A1*  2/2013   Akiyama .............. G02F 1/0121
                                                      385/2

FOREIGN PATENT DOCUMENTS

JP    2006-504145    2/2006
JP    2013-41138     2/2013

OTHER PUBLICATIONS

USPTO, (CHU) Notice of Allowance and Notice of Allowability dated Jan. 11, 2017, in parent U.S. Appl. No. 14/312,244 [allowed].

(Continued)

*Primary Examiner* — Chris Chu
(74) *Attorney, Agent, or Firm* — Fujitsu Patent Center

(57) ABSTRACT

An optical modulation apparatus includes an optical modulation unit that includes a plurality of ring optical modulators which are coupled in cascade to each other and the ring optical waveguides of which have round-trip lengths different from each other, and a controller that performs, for at least one of the ring optical modulators, first resonance wavelength adjustment control to adjust the resonance wavelength of the ring optical modulator to one input light wavelength, performs second resonance wavelength adjustment control to specify the ring optical modulator that exhibits a minimum current amount required for the adjustment of the resonance wavelength of the ring optical waveguide to the one input light wavelength from among the ring optical modulators and adjust the resonance wavelength of the specified ring optical modulator to the one input light wavelength, and performs modulation driving control for the specified ring optical modulator.

7 Claims, 17 Drawing Sheets

(51) Int. Cl.
*G02F 1/025* (2006.01)
*G02F 1/01* (2006.01)
*H04B 10/50* (2013.01)

(52) U.S. Cl.
CPC ........... *G02F 1/025* (2013.01); *H04B 10/501* (2013.01); *G02F 2201/06* (2013.01); *G02F 2201/12* (2013.01); *G02F 2203/05* (2013.01)

(56) References Cited

OTHER PUBLICATIONS

USPTO, (CHU) Restriction Requirement, dated Jul. 19, 2016, in parent U.S. Appl. No. 14/312,244 [allowed].

\* cited by examiner

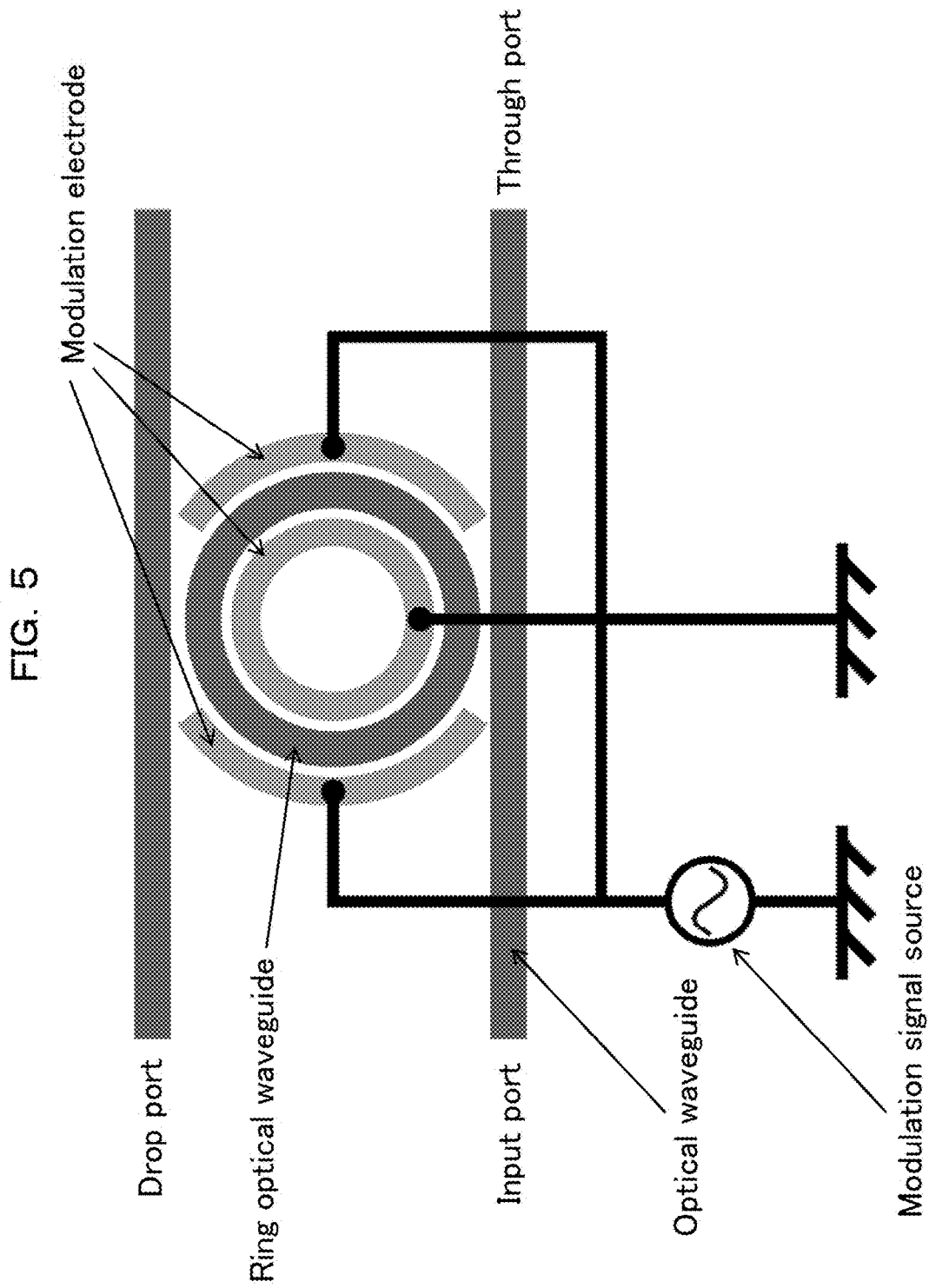

US 9,979,489 B2

OPTICAL MODULATION APPARATUS, OPTICAL TRANSMITTER AND CONTROLLING METHOD FOR OPTICAL MODULATOR

CROSS-REFERENCE TO RELATED APPLICATION

This application is a divisional of U.S. application Ser. No. 14/312,244, filed Jun. 23, 2014, which is based upon and claims the benefit of priority of the prior Japanese Patent Application No. 2013-149111, filed on Jul. 18, 2013, the entire contents of which are incorporated herein by reference.

FIELD

The embodiments discussed herein are related to an optical modulation apparatus, an optical transmitter and a controlling method for an optical modulator.

BACKGROUND

In recent years, attention is drawn to an optical function device on a silicon substrate for which a silicon electronic circuit fabrication technology capable of implementing large-scale integration at a low cost is utilized.

Meanwhile, in a high-performance server, a supercomputer and the like, enhancement of a performance is attempted by employment of a multicore configuration or the like for a CPU (Central Processing Unit) in order to satisfy a demand for enhancement of the computing power. On the other hand, in communication between chips or boards, communication by an electric signal is approaching a limit from a problem of a physical distance with respect to the computing power at an increasing speed.

An optical communication device on a large-scale silicon substrate based on a small-size silicon wire waveguide by low loss, namely, a silicon photonics, is expected as a technology that solves a problem of shortage of the communication capacity of an information processing apparatus whose speed is increasing as described above.

The silicon photonics is configured from silicon-based optical function elements such as an optical waveguide, a light emitting device, a light receiving device (photodetector), an optical modulator, an optical splitter and so forth.

It is expected that, for example, as an optical modulator in the silicon photonics, a ring optical modulator having a very small size, for example, of approximately several 10 $\mu m^2$ to 100 $\mu m^2$, and a low capacity is promising from the point of view of the power consumption and the high-speed response.

SUMMARY

According to an aspect of the embodiment, an optical modulation apparatus includes an optical modulation unit that includes a plurality of ring optical modulators individually including a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the ring optical waveguides of the plurality of ring optical modulators having round-trip lengths different from each other, and a controller that performs, for at least one of the plurality of ring optical modulators, first resonance wavelength adjustment control to adjust the resonance wavelength of the ring optical modulator to one input light wavelength, performs second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performs modulation driving control by supplying a modulation electric signal to the modulation electrode of the specified ring optical modulator.

According to another aspect of the embodiment, an optical transmitter includes a light source that outputs light having one wavelength, an optical modulation unit that is coupled to the light source and includes a plurality of ring optical modulators individually including a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the ring optical waveguides of the plurality of ring optical modulators having round-trip lengths different from each other, and a controller that performs, for at least one of the plurality of ring optical modulators, first resonance wavelength adjustment control to adjust the resonance wavelength of the ring optical modulator to the one input light wavelength inputted from the light source, performs second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performs modulation driving control by supplying a modulation electric signal to the modulation electrode of the specified ring optical modulator.

According to further aspect of the embodiment, an optical transmitter includes a plurality of light sources that output light having wavelengths different from each other, a plurality of optical modulation units that are coupled one by one to the plurality of light sources and individually include a plurality of ring optical modulators individually including a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the ring optical waveguides of the plurality of ring optical modulators having round-trip lengths different from each other, an optical multiplexer coupled to the plurality of optical modulation units, and a controller that performs, for at least one of the plurality of ring optical modulators of each of the plurality of optical modulation units, first resonance wavelength adjustment control to adjust the resonance wavelength of the ring optical modulator to one input light wavelength inputted from one of the light sources, performs second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performs modulation driving control by supplying a modulation electric signal to the modulation electrode of the specified ring optical modulator.

According to further aspect of the embodiment, a controlling method for an optical modulator includes performing, for at least one of a plurality of ring optical modulators included in an optical modulation unit, first resonance wavelength adjustment control to adjust a resonance wavelength of the ring optical modulators to one input light wavelength, the optical modulation unit including the plurality of ring optical modulators that individually include a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the plurality of ring optical modulators having round-trip lengths different from each other, performing second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performing modulation driving control by supplying a modulation electric signal to the modulation electrode of the specified ring optical modulator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B are schematic views illustrating a configuration of the optical modulation unit provided in the optical modulation apparatus and the optical transmitter according to the first embodiment, wherein FIG. 3A is a top plan view and FIG. 3B is a sectional view taken along line A-A' of FIG. 3A;

FIG. 5 is a schematic view depicting a configuration of one ring optical modulator that does not have a heater;

FIGS. 14A and 14B are schematic views illustrating a configuration of an optical modulation unit provided in the optical modulation apparatus and the optical transmitter according to the second embodiment, wherein FIG. 14A is a top plan view and FIG. 14B is a sectional view taken along line B-B' of FIG. 14A;

DESCRIPTION OF EMBODIMENTS

Figure 1:
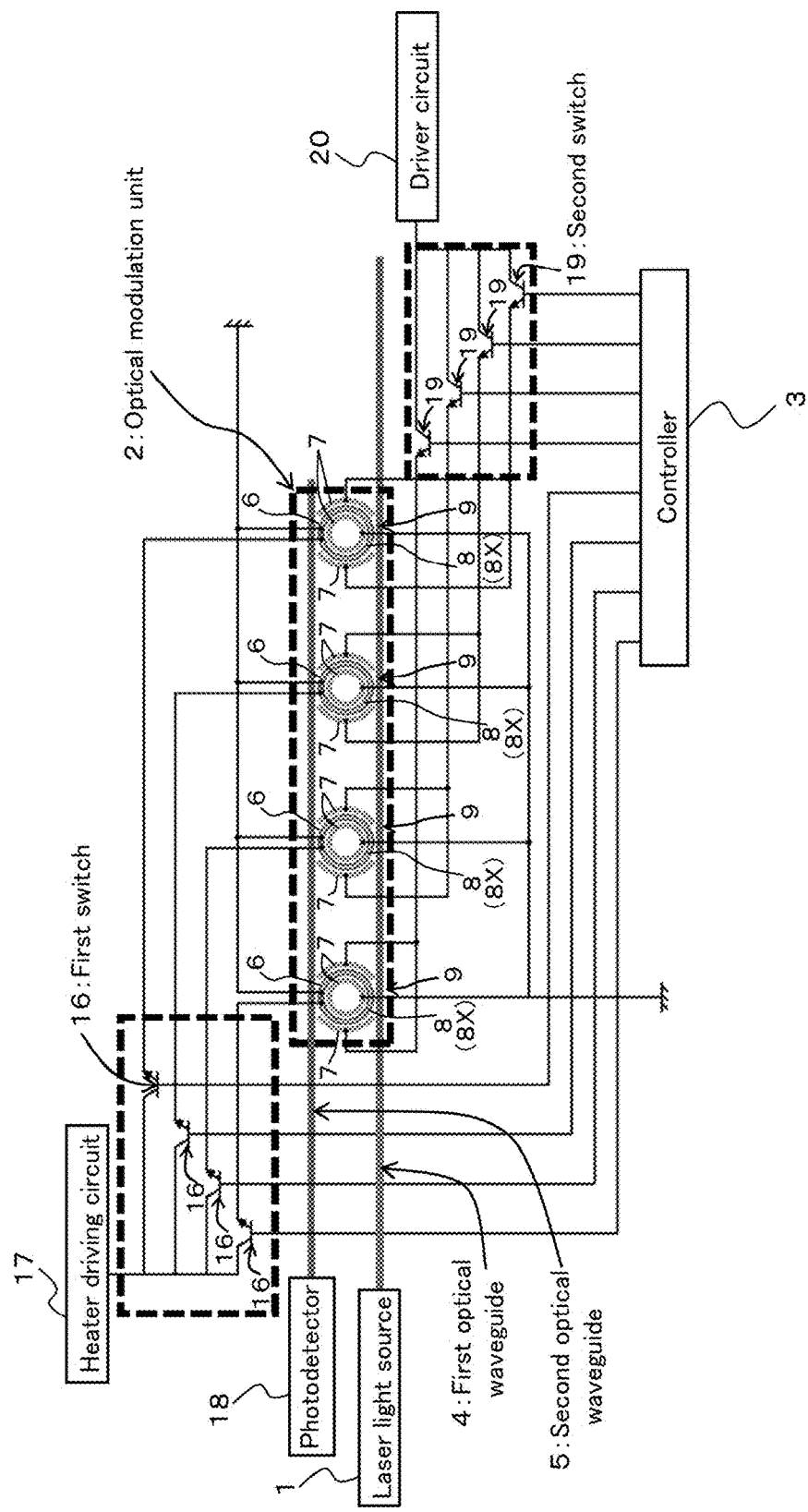
FIG. 1 is a schematic view depicting a configuration of an optical modulation apparatus and an optical transmitter according to a first embodiment.

Incidentally, since a ring optical modulator that is an optical modulator for which a ring resonator is used and for which a silicon waveguide core layer is used has a very narrow operating wavelength band, it is very difficult to adjust the resonance wavelength of the ring optical modulator to the wavelength of input light upon fabrication.

For example, the resonance wavelength of the ring optical modulator is determined by an optical circumferential length (round-trip length) of the ring optical waveguide configuring the ring optical modulator. However, a variability occurs in an equivalent refractive index from a wafer in-plane deviation, a deviation between lots or the like of the thickness of the silicon waveguide core layer of the optical waveguide. As a result, a displacement of at least approximately ±10 nm in the resonance wavelength of the ring optical modulator appears between wafers or lots.

Against such a displacement of the resonance wavelength of the ring optical modulator as just described, it seems a possible idea to adjust the resonance wavelength of the ring optical modulator by heating using a heater or by carrier injection.

However, where the resonance wavelength of the ring optical modulator is adjusted by heating using a heater, the resonance wavelength of the ring optical modulator can be shifted only to the long wavelength side. On the other hand, where the resonance wavelength of the ring optical modulator is adjusted by carrier injection, the resonance wavelength of the ring optical modulator can be shifted only to the short wavelength side.

Therefore, the wavelength adjustment amount necessary for adjusting the resonance wavelength of the ring optical modulator to the wavelength of input light is equal to a free spectral range (FSR) of the ring optical modulator in the maximum.

Here, in order to reduce the FSR, the radius of the ring optical waveguide configuring the ring optical modulator is increased. On the other hand, in order to obtain advantages that the ring optical modulator is small in size, high in speed and low in power consumption, it is desirable to decrease the radius of the ring optical waveguide configuring the ring optical modulator.

However, if the radius of the ring optical waveguide configuring the ring optical modulator is decreased so that the advantages that the ring optical modulator is small in size, high in speed and low in power consumption are obtained, then the FSR increases and the wavelength adjustment amount necessary for adjusting the resonance wavelength of the ring optical modulator to the wavelength of input light increases.

In this manner, if the wavelength adjustment amount necessary for adjusting the resonance wavelength of the ring optical modulator to the wavelength of input light increases, then the amount of current to be supplied to an electrode used for adjustment of the resonance wavelength, namely, the current amount necessary for adjusting the resonance wavelength of the ring optical modulator to the wavelength of input light, increases in both cases of heating using a heater and carrier injection. Therefore, if the wavelength adjustment amount necessary for adjusting the resonance wavelength of the ring optical modulator to the wavelength of input light is great, then the power consumption necessary for adjusting the resonance wavelength of the ring optical modulator to the wavelength of input light is high.

It is to be noted here that, while the subject mentioned above is described as a subject of the ring optical modulator for which a silicon waveguide core layer is used, there is a similar subject also in a ring optical modulator in which a different semiconductor material such as, for example, silicon germanium, InP, GaAs, or mixed crystal of them is used for a waveguide core layer.

Therefore, it is desired to suppress the power consumption necessary for adjusting the resonance wavelength of the ring optical modulator to the wavelength of input light to a low level.

In the following, an optical modulation apparatus, an optical transmitter and a controlling method for an optical modulator according to embodiments are described with reference to the drawings.

First Embodiment

First, an optical modulation apparatus, an optical transmitter and a controlling method for an optical modulator according to a first embodiment are described with reference to FIGS. 1 to 11.

As depicted in FIG. 1, the optical transmitter according to the present embodiment includes a light source 1, an optical modulation unit 2 and a controller 3. The optical modulation apparatus according to the present embodiment is configured from the optical modulation unit 2 and the controller 3. It is to be noted that, while the present embodiment is described taking, as an example, a case in which the optical transmitter is configured including the light source 1, the optical modulation apparatus can be configured also as an apparatus that does not include the light source 1, and, in this case, a light source provided separately may be coupled to the optical modulation apparatus.

Here, the light source 1 outputs light having one wavelength. For example, the light source 1 is a laser light source such as a distributed feedback (DFB) laser.

Figure 2:
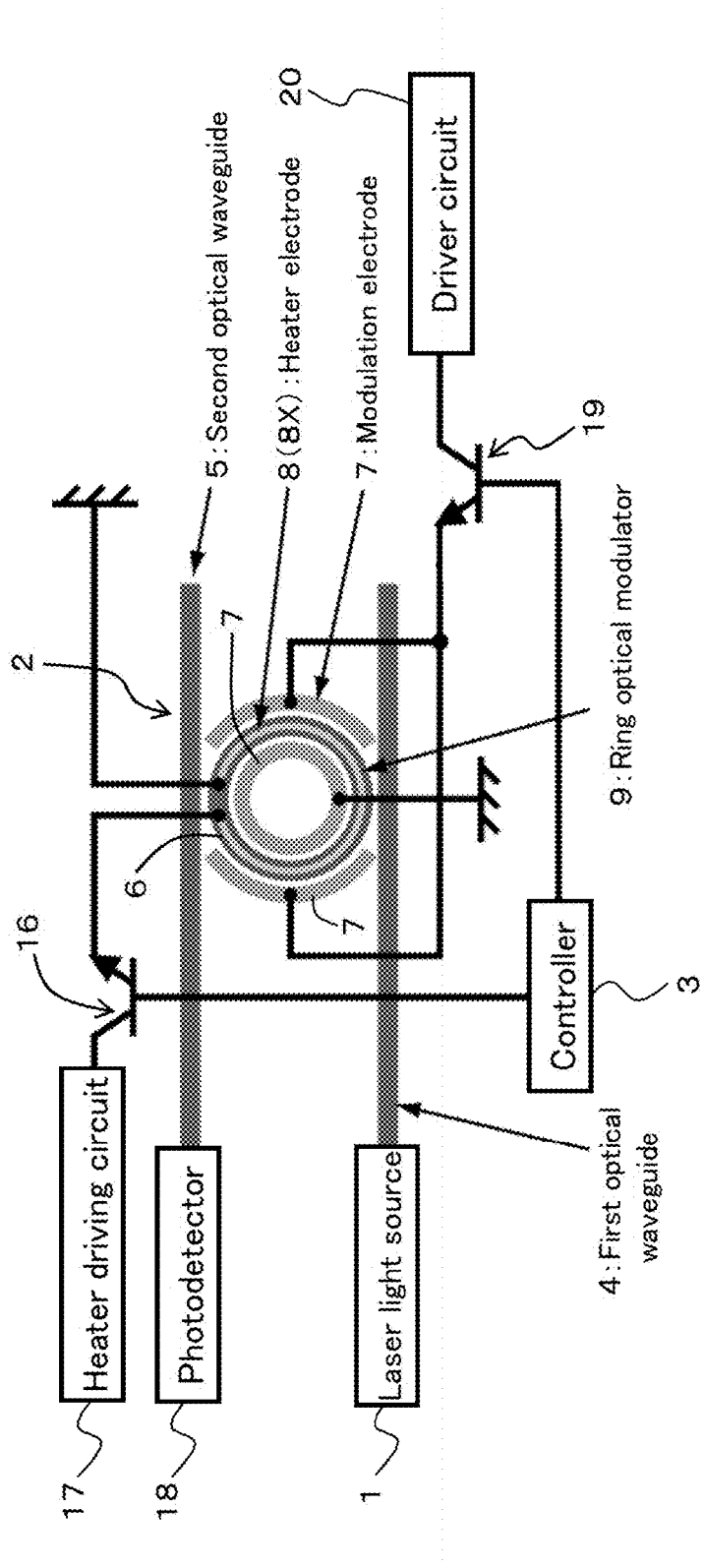
FIG. 2 is a schematic view illustrating a configuration of an optical modulation unit provided in the optical modulation apparatus and the optical transmitter according to the first embodiment.

As depicted in FIGS. 1 and 2, the optical modulation unit 2 is coupled to the light source 1 and includes a plurality of ring optical modulators 9 individually including a first optical waveguide 4, a second optical waveguide 5, a ring optical waveguide 6 optically coupled between the first optical waveguide 4 and the second optical waveguide 5, a modulation electrode 7 that is provided on the ring optical waveguide and to which a modulation electric signal (modulation signal) is supplied, and a resonance wavelength adjustment electrode 8 for adjusting a resonance wavelength. The plurality of ring optical modulators 9 are coupled in cascade. Further, the ring optical waveguides 6 of the plurality of ring optical modulators 9 have round-trip lengths (circumferential lengths) different from each other. It is to be noted that the present embodiment is described taking, as an example, a case in which four ring optical modulators 9 are provided. Further, in order to clearly indicate the configuration of each ring optical modulator 9 included in the optical modulation unit 2, one ring optical modulator 9 is selectively depicted in FIG. 2. Further, the light source 1 side of the first optical waveguide 4 is referred to as input port, the opposite side to the light source 1 side as through port, and the photodetector side of the second optical waveguide 5 as drop port.

In particular, the first optical waveguides 4 configuring the plurality of ring optical modulators 9 are coupled to each other to configure one first optical waveguide 4, and the second optical waveguides 5 configuring the plurality of ring optical modulators 9 are coupled to each other to configure one second optical waveguide 5. Further, a plurality of ring optical waveguides 6 having round-trip lengths different from each other are provided in series along the first optical waveguide 4 and the second optical waveguide 5. The modulation electrode 7 and the resonance wavelength adjustment electrode 8 are provided on each ring optical waveguide 6.

Figure 3B:
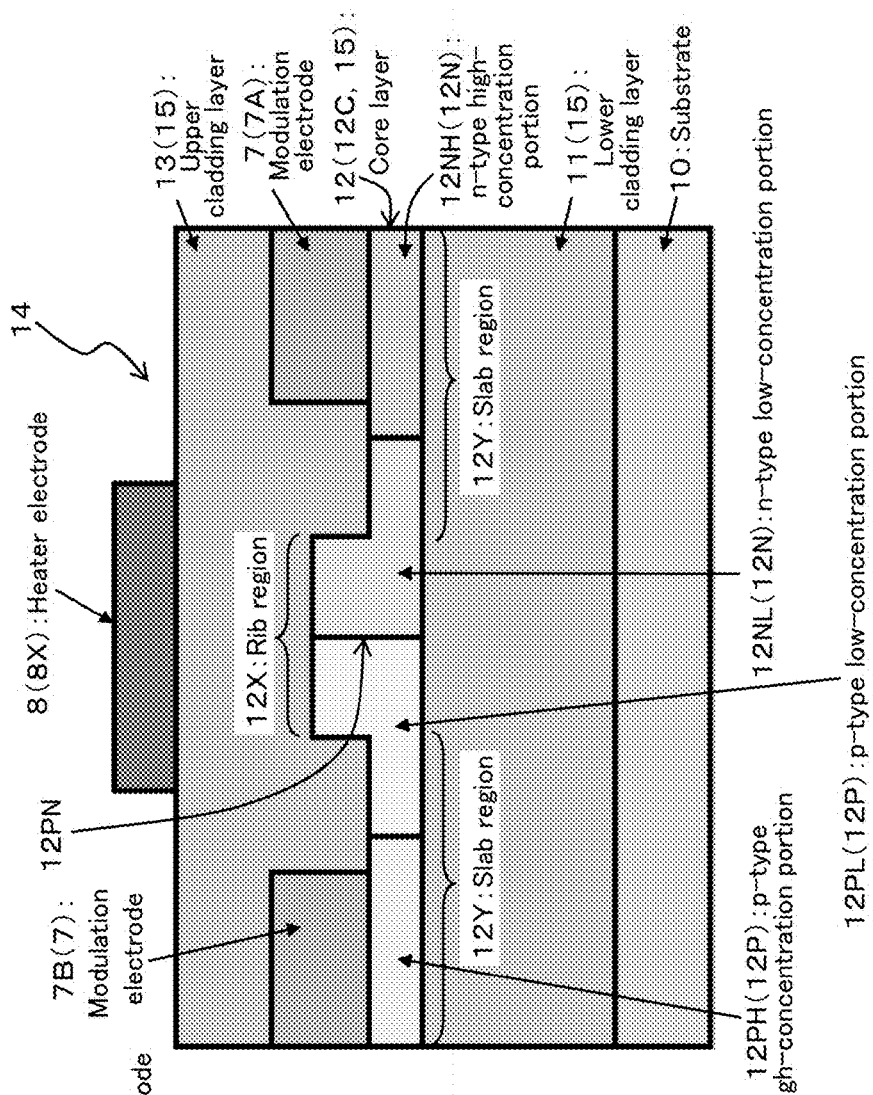
Figure 3A:
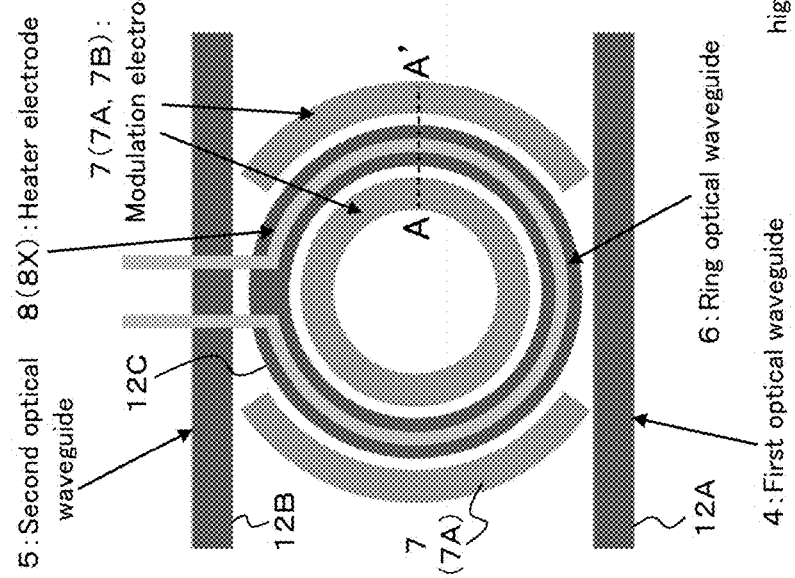

In the present embodiment, the optical modulation unit 2 is configured as an optical modulation device (optical semiconductor device) 14 having a structure wherein a lower cladding layer 11, a core layer 12 and an upper cladding layer 13 are stuck on a substrate 10 as depicted in FIGS. 3A and 3B. The laser light source 1 is integrated on the optical modulation device 14. It is to be noted that this is referred to also as optical integrated device. Here, the laser light source 1 is optically coupled with the first optical waveguide 4 using, for example, coupling by flip-chip bonding, evanescent coupling utilizing a wafer bonding technology or the like.

In particular, the optical modulation unit 2 is configured as a silicon optical modulation device 14 formed on the silicon substrate 10.

The silicon optical modulation device 14 as the optical modulation unit 2 includes a silicon optical waveguide 15 configured from a $SiO_2$ lower cladding layer 11, a silicon core layer 12 and a $SiO_2$ upper cladding layer 13 formed on the silicon substrate 10. For example, silicon configuring the substrate 10 and the core layer 12 is crystal silicon.

Then, by patterning the silicon core layer 12 in a linear shape or in a ring shape, a linear waveguide core layer 12A, a linear waveguide core layer 12B and a ring waveguide core layer 12C are formed as the waveguide core layers of the first optical waveguide 4, second optical waveguide 5 and ring optical waveguide 6 so as to be optically coupled to each other, respectively. It is to be noted that the first optical waveguide 4 is referred to also as first silicon optical waveguide including the linearly-shaped silicon waveguide core layer 12A. Further, the second optical waveguide 5 is referred to also as second silicon optical waveguide including the linear silicon waveguide core layer 12B. Further, the ring optical waveguide 6 is referred to also as silicon ring optical waveguide including a ring-shaped silicon waveguide core layer 12C.

Here, the ring silicon waveguide core layer 12C (ring silicon core layer) configuring each ring optical waveguide 6 has a rib waveguide structure (rib waveguide shape) having a rib region 12X and a slab region 12Y.

One side of each ring waveguide core layer 12C in the widthwise direction (right side in FIG. 3B) is configured as an n-type doped region 12N doped in the n type and the other side (left side in FIG. 3B) is configured as a p-type doped region 12P doped in the p type, and the n-type doped region 12N and the p-type doped region 12P are joined together at or in the proximity of a central position in the widthwise direction to form a pn junction portion 12PN. This is referred to also as horizontal pn structure. It is to be noted that, where the ring silicon waveguide core layer 12C having such a configuration as just described is used, a ring optical modulator utilizing carrier density change upon reverse biasing is configured.

Here, the rib region 12X and a region in the proximity of the rib region 12X from within the n-type doped region 12N of each ring waveguide core layer 12C function as a low doped region 12NL in which n-type impurity is doped in a low density, and the remaining region, namely, one of outer side regions of the slab region 12Y, functions as a high doped region 12NH in which n-type impurity is doped in a higher density than that of the low doped region 12NL. Further, the rib region 12X and a region in the proximity of the rib region 12X from within the p-type doped region 12P of the ring waveguide core layer 12C function as a low doped region 12PL in which p-type impurity is doped in a low density, and the remaining region, namely, the other one of the outer side regions of the slab region 12Y, functions as a high doped region 12PH in which p-type impurity is doped in a higher density than that of the low doped region 12 PL.

An n-side electrode 7A configuring the modulation electrode 7 is provided along the rib region 12X on the high doped region 12NH of the n-type doped region 12N of each ring waveguide core layer 12C, namely, on one of the outer side regions of the slab region 12Y. Further, a p-side electrode 7B configuring the modulation electrode 7 is provided along the rib region 12X on the high doped region 12PH of the p-type doped region 12P of the ring silicon waveguide core layer 12C, namely, on the other one of the outer side regions of the slab region 12Y. In particular, the n-side electrode 7A and the p-side electrode 7B configuring the modulation electrode 7 are provided along the rib region 12X on both sides (outer side and inner side) across the rib region 12X of each ring waveguide core layer 12C. Here, the p-side electrode 7B is provided in a ring shape along the overall circumference on the inner side of the ring-shaped rib region 12X configuring each ring waveguide core layer 12C, and the n-side electrode 7A is provided partially on the outer side of the ring-shaped rib region 12X.

A modulation electric signal is applied to the modulation electrode 7 provided on the ring waveguide core layer 12C configuring each ring optical waveguide 6 in this manner so that intensity modulation of inputted light (laser light; input light: continuous light) having one wavelength, namely, intensity modulation by the ring optical modulator 9, can be performed. Therefore, the modulation electrode 7 is referred to also as intensity modulation electrode.

Further, a heater electrode 8X as the resonance wavelength adjustment electrode 8 is provided above each ring waveguide core layer 12C. In particular, the heater electrode 8X for heating the ring optical waveguide 6, namely, the ring-shaped waveguide core layer 12C, is provided along the rib region 12X, namely, along a substantially overall circumference of the ring-shaped rib region 12X, on the upper cladding layer 13 above the rib region 12X of each ring waveguide core layer 12C. The heater electrode 8X is configured from a resistor and generates heat if current is supplied thereto. Therefore, by supplying current to the heater electrode 8X, the ring optical waveguide 6, namely, the ring waveguide core layer 12C, can be heated to vary the refractive index of the same, and, as a result, the resonance wavelength of the ring optical modulator 9 can be adjusted. Here, if current is supplied to the heater electrode 8X, then the ring optical waveguide 6, namely, the ring waveguide core layer 12C, is heated, and the refractive index of the same varies and the resonance wavelength of the ring optical modulator 9 shifts to the long wavelength side. It is to be noted that the heater electrode 8X is referred to also as micro-heater or small-sized heater mechanism.

Further, the ring optical waveguides 6 of the plurality of (here, four) ring optical modulators 9 have round-trip lengths (circumferential lengths) different from each other, and the plurality of ring optical modulators 9 are coupled in cascade. In particular, the ring waveguide core layers 12C configuring the ring optical waveguides 6 of the plurality of (here, four) ring optical modulators 9 have round-trip lengths (circumferential lengths) different from each other, and are disposed in a juxtaposed relationship in series along the linear waveguide core layers 12A and 12B configuring the first optical waveguide 4 and the second optical waveguide 5 such that they are optically coupled between the linear waveguide core layer 12A configuring the first optical waveguide 4 and the linear waveguide core layer 12B configuring the second optical waveguide 5. Here, since the ring optical waveguides 6 of the ring optical modulators 9 individually have a circular ring shape, the ring optical waveguides 6 have ring radii different from each other.

Where the ring optical waveguides 6 of the ring optical modulators 9 are configured so as to have round-trip lengths different from each other in this manner, the resonance wavelengths of the ring optical modulators 9 are different from each other. In particular, the resonance wavelengths of the ring optical modulators 9 are different from each other in a state in which a modulation electric signal is not supplied to the modulation electrode 7 and besides current is not supplied to the resonance wavelength adjustment electrode 8.

In the present embodiment, the distances between the resonance wavelengths of the plurality of ring optical modulators 9 are substantially equal to each other in a state in which a modulation electric signal is not supplied to the modulation electrode 7 and current is not supplied to the resonance wavelength adjustment electrode 8. In particular, the round-trip lengths (or ring radii) of the ring optical waveguides 6 of the ring optical modulators 9 are set such that the distances between the resonance wavelengths of the plurality of ring optical modulators 9 are equal to each other.

Here, while the resonance wavelength of one ring optical modulator 9 has a very great variability with respect to the wavelength of input light (oscillation wavelength of the laser light source 1; signal light wavelength), the accuracy of relative resonance wavelength distances of the plurality of ring optical modulators 9 is high. In particular, although sufficient accuracy is not obtained for the resonance wavelength of one ring optical modulator 9 and a wavelength variation by approximately±10 nm appears between wafers or lots, relative wavelength accuracy, for example, by approximately ±0.2 nm or less is obtained at close range in a plane. Therefore, it is possible to form a ring optical modulator group configured from the plurality of ring optical modulators 9 in which the resonance wavelength is displaced relatively by a desired amount with respect to a certain ring optical modulator 9. Therefore, by coupling N ring optical modulators 9 in cascade to each other and making the round-trip lengths (or ring radii or ring diameters) of the ring optical modulators 9 different from each other little by little, a configuration can be implemented in which, while the resonance wavelength distances (FSR; Free Spectrum Range; inter-peak distance of a transparent spectrum) of the ring optical modulators 9 are substantially equal to each other, the resonance wavelengths of the ring optical modulators 9 are displaced from each other by a distance of FSR/N and the resonance wavelengths of the ring optical modulators 9 are disposed in a substantially equally spaced relationship from each other by the distance of FSR/N. For example, the round-trip length (or a ring radius) of the ring optical waveguide 6 of a certain ring optical modulator 9 is determined such that the resonance wavelength of the certain ring optical modulator 9 coincides with the wavelength of the input light in design and the round-trip length (or ring radius) of the ring optical waveguide 6 configuring the other ring optical modulator 9 is displaced by a fixed value with respect to the round-trip length of the ring optical waveguide 6 of the certain one ring optical modulator 9. Consequently, the resonance wavelengths of the ring optical modulators 9 can be displaced by FSR/N from each other and disposed in a substantially equally spaced relationship from each other. Here, the" substantially equal distance" includes not only a fully equal distance but also a distance displaced by some quantity due to a fabrication error or the like. In this manner, the distances between the resonance wavelengths of the plurality of ring optical modulators to be coupled in cascade can be set to a value obtained by dividing the FSR of a certain ring optical modulator by the number of ring optical modulators coupled in cascade.

Figure 4:
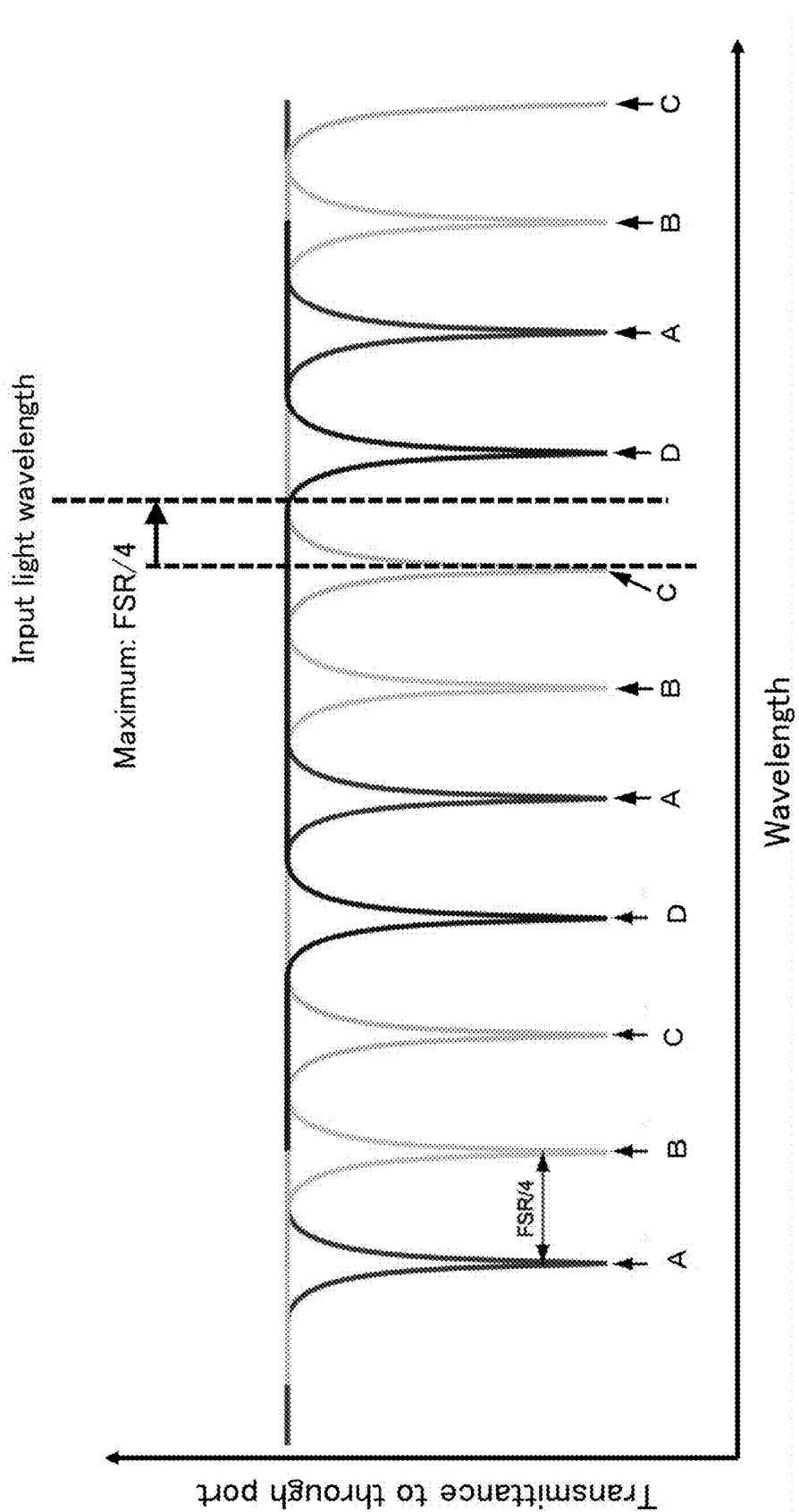
FIG. 4 is a view depicting a transmission spectrum (transmittance from an input port to a through port) of each of ring optical modulators provided in the optical modulation apparatus and the optical transmitter according to the first embodiment.

Here, FIG. 4 depicts a transmission spectrum (transmittance from the input port to the through port of the first optical waveguide 4) of each of the ring optical modulators 9 where four ring optical modulators 9 are coupled in cascade. It is to be noted that, in FIG. 4, reference characters A to D are applied to the resonance wavelengths of the four ring optical modulators 9, namely, to peaks of the transmission spectra.

As depicted in FIG. 4, the resonance wavelengths of the ring optical modulators 9 can be disposed in a substantially equally spaced relationship from each other by a distance of FSR/4.

One of the plurality of ring optical modulators 9 is selected in response to the wavelength of input light, and intensity modulation of the input light is performed using the selected one of the ring optical modulators 9.

Therefore, the controller 3 performs resonance wavelength adjustment control (first resonance wavelength adjustment control) to adjust the resonance wavelength of the ring optical modulator 9 to light having one wavelength (namely, one input light wavelength) inputted from the light source 1.

In order to perform the resonance wavelength adjustment control by the controller 3, resonance wavelength adjustment switches (first switches) 16 connected one by one to the resonance wavelength adjustment electrodes 8 of the plurality of ring optical modulators 9 are provided as depicted in FIGS. 1 and 2. One of the plurality of ring optical modulators 9 can be selected by the resonance wavelength adjustment switch 16 to perform the resonance wavelength adjustment control to adjust the resonance wavelength of the selected one of the ring optical modulators 9 to the wavelength of the input light. In particular, the heater electrode 8X as the resonance wavelength adjustment electrode 8 of each ring optical modulator 9 is connected to a heater driving circuit 17 through the resonance wavelength adjustment switch 16. It is to be noted that the heater driving circuit 17 may be configured so as to include a heater power supply or may be configured so as to be connected to a heater power supply provided separately. One ring optical modulator 9 can be selected by switching on one of the resonance wavelength adjustment switches 16 and switching off the remaining resonance wavelength adjustment switches 16, and, by supplying current to the resonance wavelength adjustment electrode 8 of the selected ring optical modulator 9 through the heater driving circuit 17, the resonance wavelength adjustment control to adjust the resonance wavelength of the selected ring optical modulator 9 to the wavelength of input light can be performed individually.

Here, the resonance wavelength adjustment switch 16 is configured from a transistor such that changeover control between on and off is performed by a controlling signal from the controller 3. In particular, the controller 3 performs control to changeover the resonance wavelength adjustment switch 16 in order to select a ring optical modulator 9 for which the resonance wavelength adjustment control is to be performed. It is to be noted that the resonance wavelength adjustment switch 16 may be integrated on the silicon optical modulation device 14 or may be included in a controlling circuit provided in the controller 3. In particular, the resonance wavelength adjustment switch 16 may be included in one of the optical modulation unit 2 and the controller 3. Further, the heater driving circuit 17 or the heater power supply may be configured so as to be included in the optical modulation apparatus or may be configured so as to be connected to the optical modulation apparatus.

Further, in the present embodiment, a photodetector (PD) 18 is coupled to the second optical waveguide 5. In particular, the photodetector 18 for detecting output power (power;

light intensity) of light inputted to the second optical waveguide 5 is coupled to the second optical waveguide 5. The controller 3 performs the resonance wavelength adjustment control for the ring optical modulators 9 based on information detected by the photodetector 18. In particular, the PD 18 is coupled to the ring optical modulators 9 through the second optical waveguide 5, and it can be detected by the PD 18 what transmission characteristic the ring optical modulators 9 have with respect to the input light (laser light). Therefore, the controller 3 performs the resonance wavelength adjustment control for the ring optical modulators 9 based on the detected transmission characteristic. Here, for example, a pin type PD having an InGaAs absorption layer or a Ge absorption layer may be used for the PD 18 and the PD may be integrated in the silicon optical modulation device 14. In this case, the optical modulation unit 2 includes the PD 18. It is to be noted that the PD 18 may not be integrated in the silicon optical modulation device 14 but may be coupled to the optical modulation unit 2 (here, the second optical waveguide 5).

Further, the controller 3 performs the resonance wavelength adjustment control and modulation driving control. In the present embodiment, the controller 3 performs control for the resonance wavelength adjustment switch 16 or the heater driving circuit 17 in order to perform the resonance wavelength adjustment control, and performs control for a modulation driving switch (second switch) 19 and a driver circuit 20 in order to perform the modulation driving control. The controller 3 is a computer (controlling circuit) including, for example, a CPU, a memory, a storage apparatus and so forth.

Here, the controller 3 specifies a ring optical modulator 9 whose current amount required for adjusting the resonance wavelength of the ring optical modulator 9 to one wavelength of input light is minimum from among the plurality of ring optical modulators 9 and supplies current to the resonance wavelength adjustment electrode 8 of the specified ring optical modulator 9 to perform the resonance wavelength adjustment control (second resonance wavelength adjustment control) to adjust the resonance wavelength of the specified ring optical modulator 9 to the one wavelength of the input light.

Here, the controller 3 drives the laser light source 1 to input laser light to the first optical waveguide 4 of the optical modulation unit 2 and changes over the resonance wavelength adjustment switch 16 while monitoring the value of the PD 18 to perform the resonance wavelength adjustment control (first resonance wavelength adjustment control) to adjust the resonance wavelengths of the ring optical modulators 9 to the wavelength of the inputted laser light one by one. Consequently, the controller 3 acquires the current amount required for adjusting the resonance wavelength of the ring optical modulator 9 to the wavelength of the inputted laser light for all of the ring optical modulators 9. Here, the controller 3 further acquires power consumption based on the acquired current amounts. Then, the controller 3 specifies a minimum one of the acquired power consumption (current amounts) and specifies a ring optical modulator 9 whose power consumption (current amount) required for adjusting the resonance wavelength of the ring optical modulator 9 to the wavelength of the inputted laser light is minimum from among the plurality of ring optical modulators 9. Thereafter, the resonance wavelength adjustment switch 16 is changed over to select the specified ring optical modulator 9, and current is supplied to the resonance wavelength adjustment electrode 8 of the specified ring optical modulator 9 to perform the resonance wavelength adjustment control (second resonance wavelength adjustment control) for the specified ring optical modulator 9. Consequently, the optical transmitter is initialized. In particular, such control as just described is performed, for example, every time the optical transmitter is started up (power supply is switched on). It is to be noted here that, while the ring optical modulator 9 having the minimum power consumption is specified using the power consumption, the specification is not limited to this and the ring optical modulator having the minimum current amount maybe specified using the current amount.

Where such resonance wavelength adjustment control as described above is performed when the transmission spectra of the ring optical modulators 9 are such as depicted in FIG. 4 and the resonance wavelengths of the ring optical modulators 9 are disposed in a substantially equally spaced relationship from each other by the distance of FSR/4, as described above, the current amount (power consumption) required for adjusting the resonance wavelength of the ring optical modulator 9 to the wavelength of the inputted laser light reduced to ¼ in the maximum in comparison with that of a case in which only one ring optical modulator 9 is provided. In particular, where the resonance wavelength adjustment control is performed when N ring optical modulators 9 are coupled in cascade and the resonance wavelengths of the ring optical modulators 9 are disposed in a substantially equally spaced relationship from each other by the distance of FSR/N, namely, where a ring optical modulator 9 whose power consumption (current amount) required for wavelength matching to the wavelength of the inputted laser light is minimum is selected and used, the power consumption (wavelength controlling power; resonance wavelength controlling power) required for adjusting the resonance wavelength of the ring optical modulator 9 to the wavelength of the inputted laser light can be reduced to 1/N in the maximum. Therefore, the wavelength controlling power and the operation temperature of the ring optical modulator 9 can be decreased.

It is to be noted that, even if it is said that the relative wavelength difference between the ring optical modulators 9 can be controlled with high accuracy to some degree, errors cannot actually be reduced to 0 and, actually it is difficult to make the resonance wavelength distances between the ring optical modulators 9 fully equal to each other. However, also in this case, the reduction effect of power consumption required for the wavelength matching can be expected if the resonance wavelengths are disposed in a spaced relationship by a distance from each other such that the resonance wavelengths are not the same wavelength as each other taking the amount by which the resonance wavelengths of the ring optical modulators 9 are displaced by the fabrication accuracy into consideration. Further, this signifies that the resonance wavelength distance between the ring optical modulators 9 may only be a distance higher than relative accuracy of the resonance wavelengths between the ring optical modulators 9.

Further, the controller 3 supplies a modulation electric signal to the modulation electrode 7 of the specified ring optical modulator 9 to perform the modulation driving control. The modulation driving control is performed so that the transmission spectrum of the ring optical modulator 9 is varied at a high speed based on the modulation electric signal supplied to the modulation electrode 7 to modulate the intensity of light to be outputted from the output port at a high speed.

In order to perform the modulation driving control by the controller 3, the modulation driving switches (second switches) 19 connected one by one to the modulation electrodes 7 of the plurality of ring optical modulators 9 are provided. By the modulation driving switches 19, the specified ring optical modulator 9 can be selected from among the plurality of ring optical modulators 9 such that the modulation electric signal is supplied to the modulation electrode 7 of the specified ring optical modulator 9 to perform the modulation driving control. In particular, the modulation electrodes 7 of the ring optical modulators 9 are coupled to the driver circuit 20 through the modulation driving switches 19. It is to be noted that the driver circuit 20 may be configured so as to include a modulation signal source or may be configured so as to be coupled to a modulation signal source provided separately. The specified ring optical modulator 9 can be selected by switching on the modulation driving switch 19 connected to the specified ring optical modulator 9 but switching off the remaining modulation driving switch 19, and the modulation electric signal can be supplied to the modulation electrode 7 of the specified ring optical modulator 9 through the driver circuit 20 to perform the modulation driving control. In this manner, the specified ring optical modulator 9, namely, the ring optical modulator 9 to be driven for modulation, can be selected by the modulation driving switch 19.

Here, the modulation driving switch 19 is configured from a transistor and changeover control thereof between on and off is performed based on a controlling signal from the controller 3. In particular, the controller 3 performs control to change over the modulation driving switch 19 in order to select the ring optical modulator 9 to perform the modulation driving control. It is to be noted that the modulation driving switch 19 may be integrated on the silicon optical modulation device 14 or maybe included in the controlling circuit provided in the controller 3. In particular, the modulation driving switch 19 may be included in one of the optical modulation unit 2 and the controller 3. Further, the driver circuit 20 or the modulation signal source may be configured so as to be included in the optical modulation apparatus or may be configured so as to be connected to the optical modulation apparatus.

While the optical modulation unit 2 is configured such that the plurality of ring optical modulators 9 are coupled in cascade in this manner, only the specified ring optical modulator 9 is driven for modulation actually. In this case, since the input light inputted from the light source 1 side (input port) of the first optical waveguide 4 of the optical modulation unit 2 has a wavelength that satisfies a resonance condition (resonance wavelength) of the specified ring optical modulator 9, the intensity modulation is performed for the input light by the specified ring optical modulator 9 while the intensity-modulated signal light (optical signal) is outputted from the opposite side (through port; output port) to the light source 1 side of the first optical waveguide 4. It is to be noted that the operation principle of the specified ring optical modulator 9 is same as that of the ring optical modulator in a case in which only one ring optical modulator is provided as hereinafter described.

Incidentally, the reason why the optical modulation unit 2 is configured so as to include the plurality of ring optical modulators 9 coupled in cascade and only the ring optical modulator 9 specified as a ring optical modulator having minimum power consumption (current amount) as a result of the resonance wavelength adjustment control is driven for modulation is such as follows.

First, an operation principle of the ring optical modulator where only such one ring optical modulator which does not have a heater as depicted in FIG. 5 is provided is described with reference to FIGS. 5 to 8C.

Figure 6A:
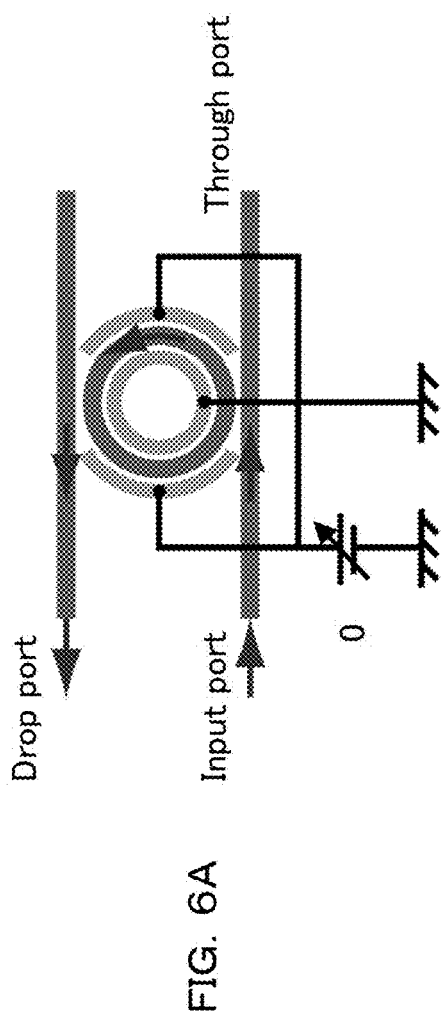
FIGS. 6A and 6B are schematic views illustrating operation of one ring optical modulator that does not have a heater.
Figure 6B:
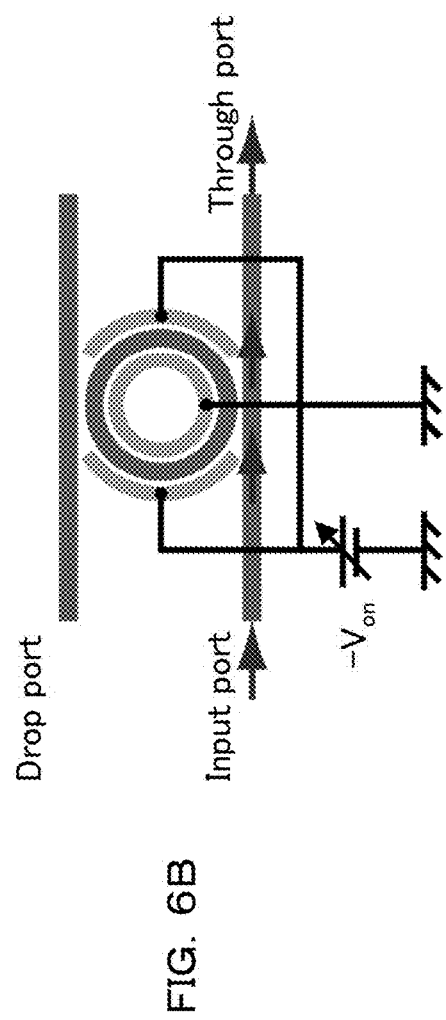
Figure 7:
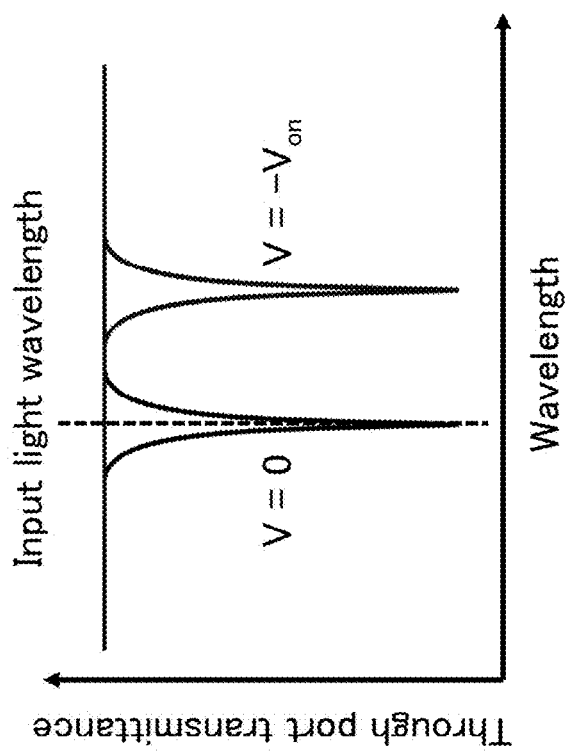
FIG. 7 is a view depicting a transmission spectrum (transmittance from an input port to a through port) of one ring optical modulator that does not have a heater and is a view illustrating operation of the ring optical modulator.

In such a ring optical modulator as depicted in FIG. 5, where the wavelength of the input light inputted from the input port satisfies the resonance condition (resonance wavelength) of the ring optical modulator (ring resonator) in a state in which the modulation electric signal is not supplied to the modulation electrode, the input light propagates to the drop port as depicted in FIGS. 6A, 6B and 7, but where the wavelength of the input light is displaced from the resonance wavelength, the input light propagates to the through port.

Since the resonance wavelength of the ring optical modulator is determined based on the optical circumferential length of the ring optical waveguide configuring the ring optical modulator, for example, by varying the refractive index utilizing an electro-optical effect by an electric signal to vary the optical circumferential length, the resonance wavelength of the ring optical modulator can be varied. This signifies that the transmittance to the drop port and the through port as viewed from the input port varies, and as a result, the light intensity appearing at the drop port and the through port varies. Therefore, by applying the modulation electric signal to the modulation electrode of the ring optical modulator to modulate the refractive index, the light intensity modulation operation is obtained.

For example, where the resonance condition is satisfied when the application voltage V to the modulation electrode of the ring optical modulator is 0 V, namely, where the resonance wavelength of the ring optical modulator coincides with the wavelength of the input light when the application voltage V is 0 V, if the voltage V to be applied to the modulation electrode of the ring optical modulator is set to 0 V, then the input light inputted from the input port propagates to the drop port as depicted in FIG. 6A. On the other hand, if the voltage V to be applied to the modulation electrode of the ring optical modulator is set to −Von, then the resonance wavelength of the ring optical modulator is displaced from the wavelength of the input light and the input light inputted from the input port propagates to the through port as depicted in FIG. 6B.

In this case, the transmission characteristic of the ring optical modulator, namely, the transmittance to the through port as viewed from the input port, varies as depicted in FIG. 7, and becomes minimum when the application voltage V to the modulation electrode of the ring optical modulator is 0 V but becomes maximum when the application voltage V is −Von. It is to be noted here that, while the transmittance is maximum when the application voltage V is −Von, the transmittance is not limited to this, and for example, where the voltage amplitude capable of being applied is limited, the transmittance may not be maximum when the application voltage V is −Von.

Figure 8A:
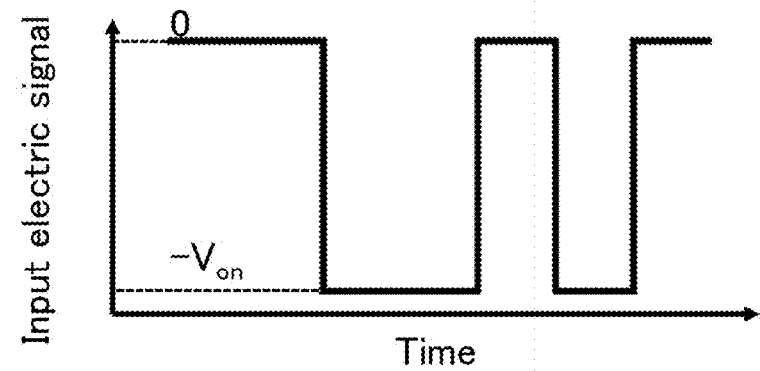
FIGS. 8A to 8C are views illustrating light intensity modulation by one ring optical modulator that does not have a heater.
Figure 8B:
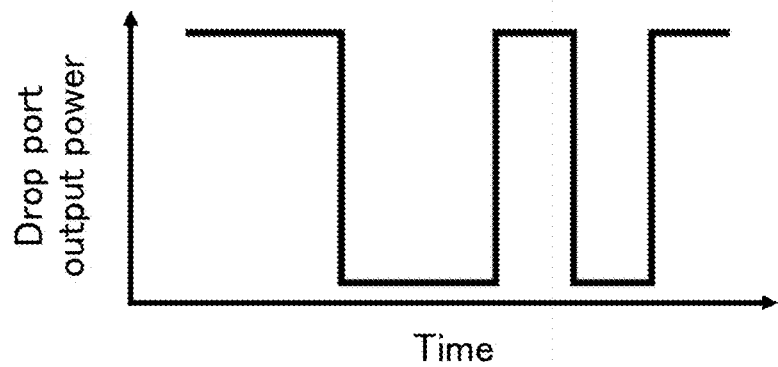
Figure 8C:
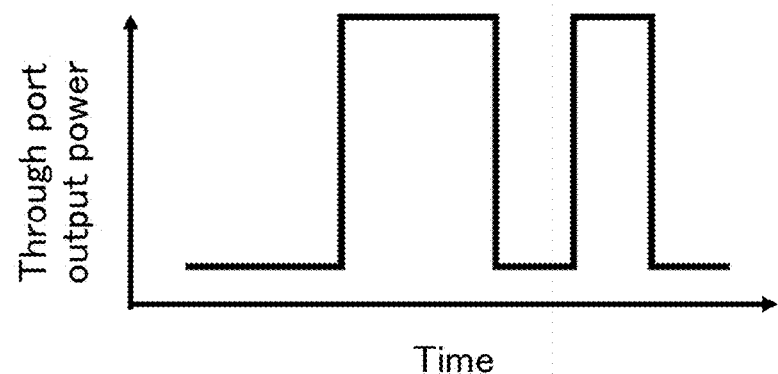

Therefore, if, for example, such a modulation electric signal (input electric signal) as depicted in FIG. 8A is inputted to the modulation electrode of the ring optical modulator, then the power (light intensity) of light to be outputted from the drop port varies as depicted in FIG. 8B and the power of light to be outputted from the through port varies as depicted in FIG. 8C. In particular, an inverted signal (light intensity modulation signal) inverted from the modulation electric signal (here, modulation voltage signal) appears at the through port, and a non-inverted signal (light intensity modulation signal) same as the modulation electric signal appears at the drop port. In this case, the drop port maybe used as the output port or the through port may be used as the output port by performing signal processing for the inverted signal appearing at the through port.

It is to be noted here that, since the present embodiment is described taking, as an example, a case in which the application voltage V to the modulation electrode of the ring optical modulator is 0 V and −Von and the resonance condition is satisfied when the application voltage V to the modulation electrode 7 of the ring optical modulator 9 is 0 V, namely, a case in which the resonance wavelength of the ring optical modulator coincides with the wavelength of the input light when the application voltage V is 0 V, while the inverted signal and the non-inverted signal appear at the through port and the drop port, respectively, the processing method in the present invention is not limited to this. For example, where the application voltage V to the modulation electrode of the ring optical modulator is 0 V and −Von and the resonance condition is satisfied when the application voltage V to the modulation electrode 7 of the ring optical modulator 9 is −Von, namely, where the resonance wavelength of the ring optical modulator coincides with the wavelength of the input light when the application voltage V is −Von, or, where the application voltage V to the modulation electrode of the ring optical modulator is 0 V and +Von and the resonance condition is satisfied when the application voltage V to the modulation electrode 7 of the ring optical modulator 9 is 0 V, namely, where the resonance wavelength of the ring optical modulator coincides with the wavelength of the input light when the application voltage V is 0 V, the non-inverted signal and the inverted signal appear at the through port and the drop port, respectively. In this case, the through port may be used as the output port or the drop port may be used as the output port by performing signal processing for the inverted signal appearing at the drop port.

In this manner, one of the drop port and the through port can be used as the output port by the wavelength of the input light, resonance wavelength of the ring optical modulator, signal processing and so forth.

Where such a ring optical modulator as described above is configured as a silicon ring optical modulator whose optical waveguide is configured from a silicon optical waveguide including a silicon waveguide core layer, advantages that the ring optical modulator is small in size, high in speed and low in power consumption are obtained. However, the operation wavelength band is very narrow and it is very difficult to adjust the resonance wavelength of the ring optical modulator to the wavelength of the input light upon fabrication.

For example, while the resonance wavelength of the ring optical modulator is determined based on the optical circumferential length (round-trip length) of the ring optical waveguide configuring the ring optical modulator, a variability appears in the equivalent refractive index from a wafer in-plane difference or an inter-lot difference of the thickness of the silicon waveguide core layer of the optical waveguide. Therefore, as a result, in the resonance wavelength of the ring optical modulator, a displacement of approximately±10 nm appears between wafers or lots.

For such a displacement of the resonance wavelength of the ring optical modulator as described above, it seems a possible idea to adjust the resonance wavelength of the ring optical modulator by a method of providing a heater (micro-heater) in the ring optical modulator to adjust the refractive index by thermal control or another method of adjusting the refractive index by a carrier plasma effect by carrier injection. It is to be noted that a ring optical modulator in which a heater is provided is referred to also as heater-mounted type ring optical modulator or as micro-heater-mounted type ring optical modulator.

However, where the resonance wavelength of the ring optical modulator is adjusted by thermal control using the heater (refer to FIG. 9), the resonance wavelength of the ring optical modulator can be shifted only to the long wavelength side. On the other hand, where the resonance wavelength of the ring optical modulator is adjusted by carrier injection, the resonance wavelength of the ring optical modulator can be shifted only to the short wavelength side. Therefore, the wavelength adjustment amount necessary for adjusting the resonance wavelength of the ring optical modulator to the wavelength of the input light is equal to the FSR of the ring optical modulator in the maximum (refer to FIG. 10).

Here, in order to reduce the FSR, the radius of the ring optical waveguide (ring waveguide core layer) configuring the ring optical modulator is set large. On the other hand, in order to obtain advantages that the ring optical modulator is small in size, high in speed and low in power consumption, it is desirable to reduce the radius of the ring optical waveguide configuring the ring optical modulator.

If the radius of the ring optical waveguide (ring waveguide core layer) configuring the ring optical modulator is reduced so that the advantages that the ring optical modulator is small in size, high in speed and low in power consumption are obtained, then the FSR increases and the wavelength adjustment amount required for adjusting the resonance wavelength of the ring optical modulator to the wavelength of the input light increases.

In this manner, if the wavelength adjustment amount required for adjusting the resonance wavelength of the ring optical modulator to the wavelength of the input light is great, then the current amount to be supplied to the electrode used for adjustment of the resonance wavelength, namely, the current amount required for adjusting the resonance wavelength of the ring optical modulator to the wavelength of the input light, is great in both cases of the heating by the heater and the carrier injection. Therefore, if the wavelength adjustment amount required for adjusting the resonance wavelength of the ring optical modulator to the wavelength of the input light becomes great, then the power consumption required for adjusting the resonance wavelength of the ring optical modulator to the wavelength of the input light becomes great.

Figure 9:
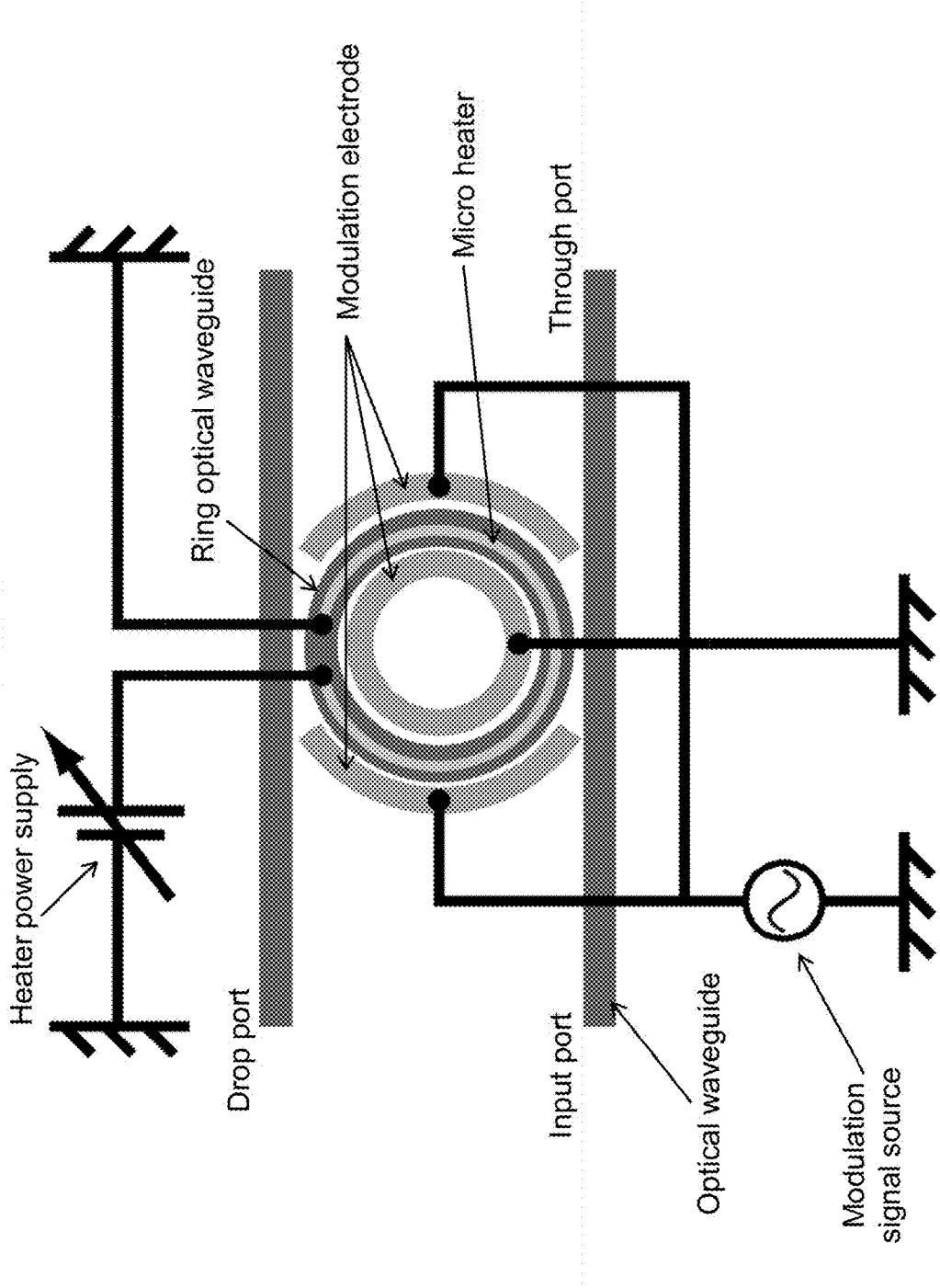
FIG. 9 is a schematic view depicting a configuration of one ring optical modulator having a heater.
Figure 10:
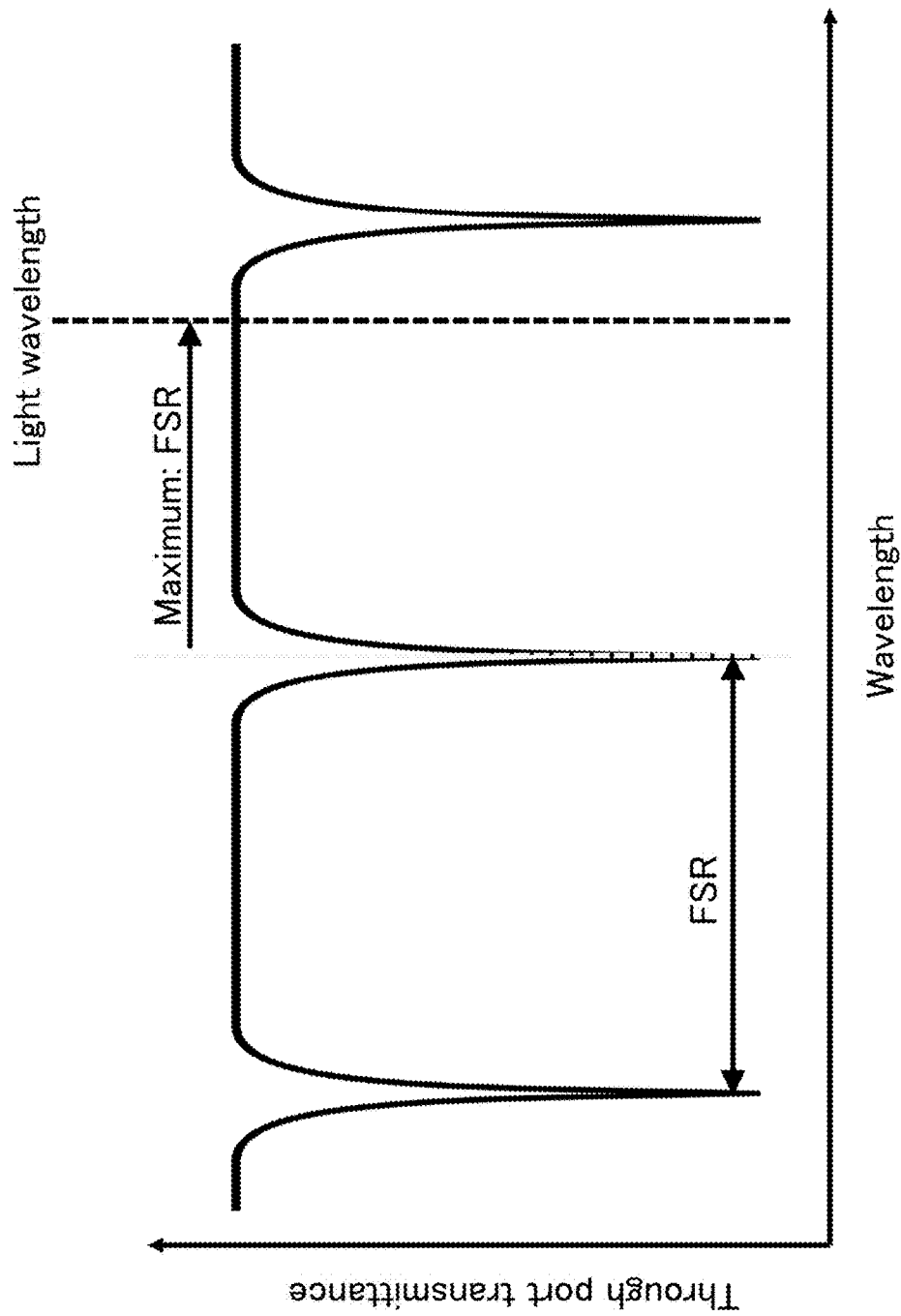
FIG. 10 is a view depicting a transmission spectrum (transmittance from an input port to a through port) of one ring optical modulator having a heater and is a view illustrating adjustment of the resonance wavelength of the ring optical modulator.

For example, in such a micro-heater mounting type ring optical modulator as depicted in FIG. 9, in order to achieve the advantages that the ring optical modulator is small in size, high in speed and low in power consumption, it is desirable to suppress, attaching importance to the characteristic of the ring optical modulator, the radius (ring radius) of the ring optical waveguide (ring waveguide core layer) configuring the ring optical modulator to several μm or to approximately 10 μm in the maximum. Therefore, if the ring radius is set to approximately 10 μm, then the FSR increases to approximately 11 nm.

Here, since the temperature dependency of the resonance wavelength of the ring optical modulator is approximately 0.07 nm/K from the temperature dependency of the refractive index of the silicon waveguide core, in order to cause a wavelength shift by the FSR in the ring optical modulator having the ring radius of approximately 10 μm, the temperature of the ring optical modulator is increased by approximately 160 degrees by heating using the heater. Generally, it is said that the maximum operation temperature of the pn junction formed on the silicon waveguide core is approximately 150 degrees, and, at a higher temperature than the maximum operation temperature, leak current increases and normal operation cannot be expected. Further, also from a point of view of the reliability, it is very undesirable to cause the ring optical modulator to operate at such a high temperature as just described. Further, the power consumption required for shifting the resonance wavelength of the ring optical modulator by the FSR is approximately several 10 mW and is so high that it cannot be ignored.

Therefore, as described above, the optical modulation unit 2 includes the plurality of ring optical modulators 9 coupled in cascade such that, as a result of the resonance wavelength adjustment control, only the ring optical modulator 9 specified as a ring optical modulator having minimum power consumption (current amount) is driven for modulation as depicted in FIGS. 1 and 2. Consequently, the power consumption (wavelength controlling power) required for adjusting the resonance wavelength of the ring optical modulator 9 to the wavelength of the input light can be reduced. For example, where N ring optical modulators 9 are coupled in cascade and the resonance wavelengths of the ring optical modulators 9 are disposed in a substantially equally spaced relationship from each other by the FSR/N, if a ring optical modulator 9 whose power consumption (current amount) required for wavelength matching is low with respect to the wavelength of the input light is selected and used, then the power consumption (wavelength controlling power) required for adjusting the resonance wavelength of the ring optical modulator 9 to the wavelength of the input light can be reduced to 1/N in the maximum. Therefore, the wavelength controlling power and the operation temperature of the ring optical modulators 9 can be reduced. It is to be noted that, also where a resonance wavelength displacement by approximately±10 nm appears between wafers or lots, the resonance wavelength can be adjusted through the lower power consumption, and also the yield can be increased.

It is to be noted that, since the heater electrode 8X as the resonance wavelength adjustment electrode 8, resonance wavelength adjustment switch 16, heater driving circuit 17 (which may include a heater power supply) and function (resonance wavelength adjustment controlling unit) of the controller 3 for performing the resonance wavelength adjustment control are used as a mechanism for adjusting the resonance wavelength of the ring optical modulator 9 in the present embodiment, the components just described are collectively referred to also as resonance wavelength adjustment mechanism or resonance wavelength controlling circuit.

Now, the control (controlling method for an optical modulator) by the controller 3 included in the optical transmitter (or optical modulation apparatus) according to the present embodiment is described.

In the present embodiment, the controller 3 first performs the resonance wavelength adjustment control and then performs the modulation driving control.

In particular, the controller 3 performs the resonance wavelength adjustment control (first resonance wavelength adjustment control) to adjust the resonance wavelength of the ring optical modulator 9 to that of inputted light having one wavelength (namely, inputted light wavelength) individually for the plurality of ring optical modulators 9 included in the optical modulation unit 2 of the optical transmitter (or optical modulation apparatus) configured in such a manner as described above.

Then, the controller 3 specifies a ring optical modulator 9 whose current amount required for adjusting the resonance wavelength of the ring optical modulator 9 to that of the inputted light having one wavelength is minimum from among the plurality of ring optical modulators 9, and supplies current to the resonance wavelength adjustment electrode 8 of the specified ring optical modulator 9 to perform the resonance wavelength adjustment control (second resonance wavelength adjustment control) to adjust the resonance wavelength of the specified ring optical modulator 9 to the inputted light having one wavelength.

Then, the controller 3 supplies a modulation electric signal to the modulation electrode 7 of the specified ring optical modulator 9 to perform the modulation driving control.

Figure 11:
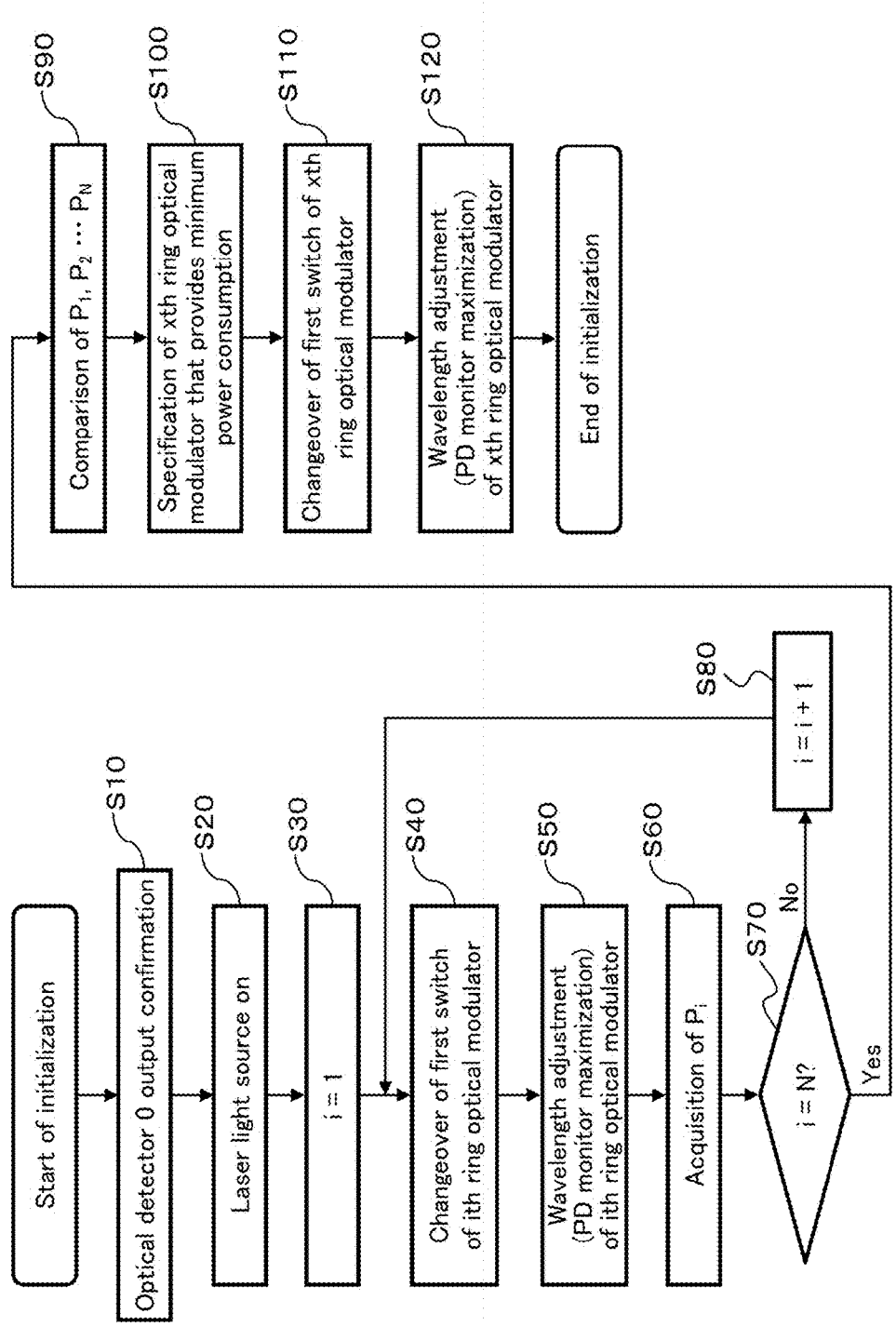
FIG. 11 is a flow chart illustrating resonance wavelength adjustment control (controlling method for an optical modulator) in the optical modulation apparatus and the optical transmitter according to the first embodiment.
Figure 12:
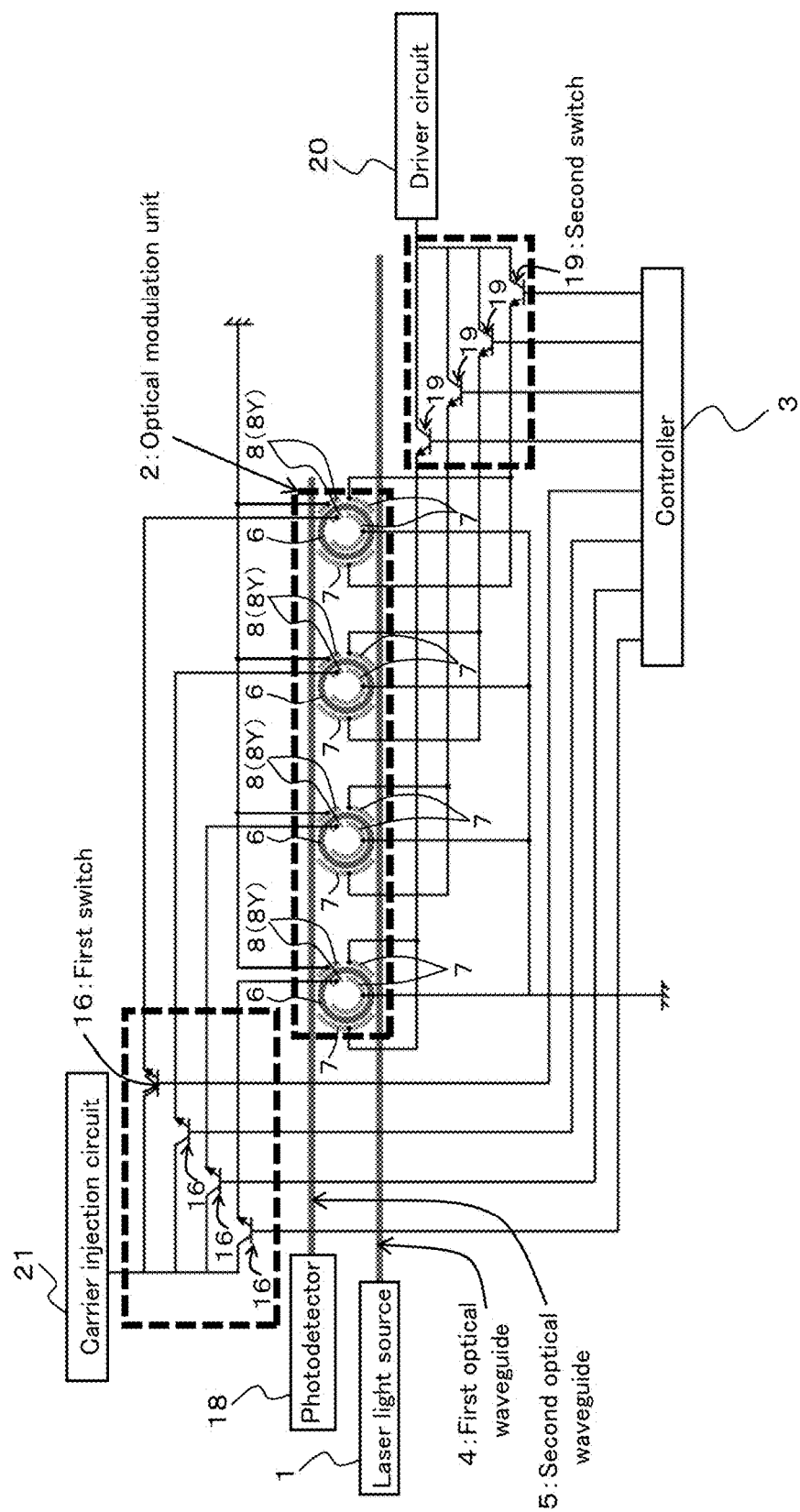
FIG. 12 is a schematic view depicting a configuration of an optical modulation apparatus and an optical transmitter according to a second embodiment.
Figure 13:
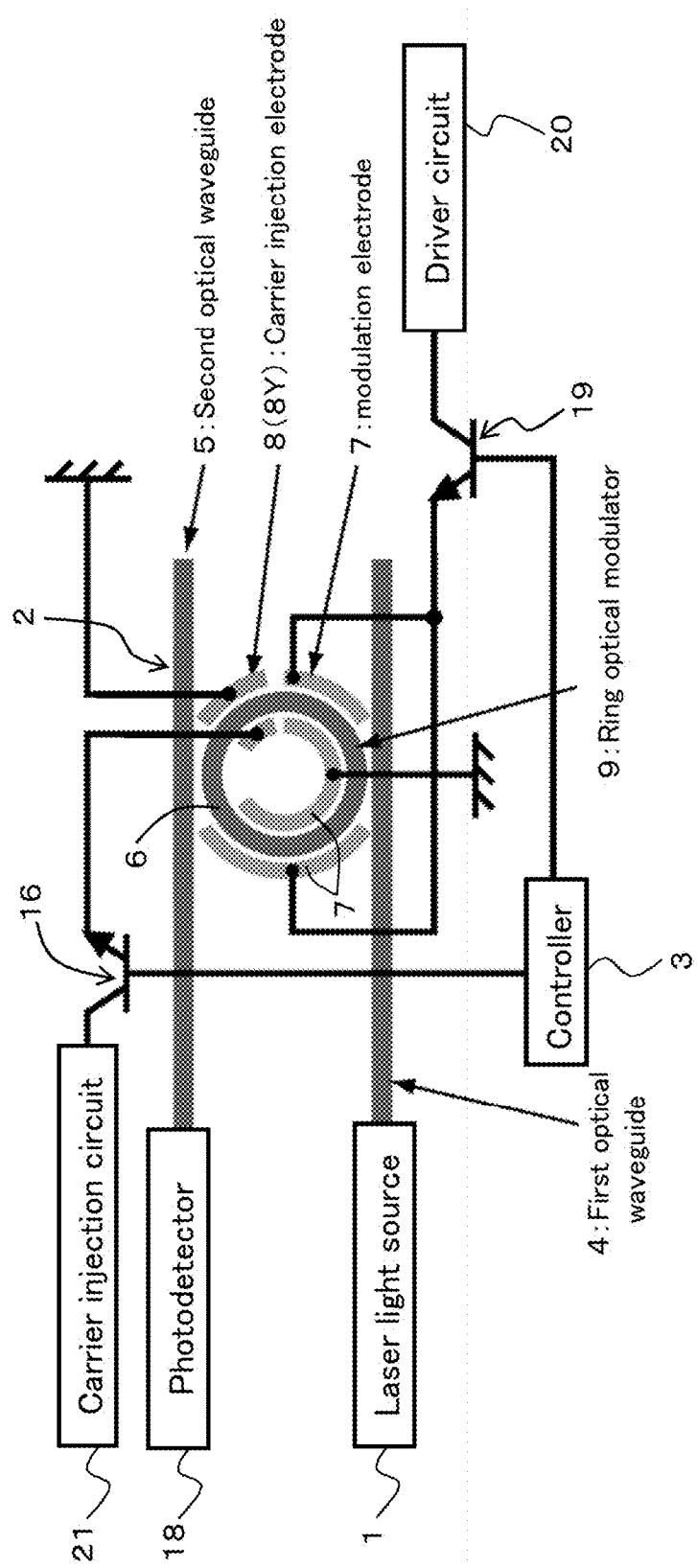
FIG. 13 is a schematic view illustrating a configuration of an optical modulation unit provided in the optical modulation apparatus and the optical transmitter according to the second embodiment.

The resonance wavelength adjustment control described above is described in detail below with reference to FIG. 11.

It is to be noted that the resonance wavelength adjustment control is referred to also as initialize, and is performed, for example, every time the optical transmitter is started up (power supply is switched on) to initialize the optical transmitter (or optical modulation apparatus).

First, the controller 3 confirms an output of "0" of the photodetector (PD) 18 (step S10) and drives the laser light source 1 (step S20). Consequently, the laser light source 1 operate to input laser light to the first optical waveguide 4 of the optical modulation unit 2.

Then, the controller 3 sets a flag i indicating for what numbered one of the plurality of ring optical modulators 9 the resonance wavelength adjustment control is to be performed to "1" (step S30). Then, in order to perform the resonance wavelength adjustment control for the first ring optical modulator 9, the controller 3 changes over the resonance wavelength adjustment switch (first switch) 16 connected to the first ring optical modulator 9 to an on state and changes over the resonance wavelength adjustment switches (first switch) 16 connected to the remaining ring optical modulators 9 to an off state (step S40).

Then, the controller 3 performs the resonance wavelength adjustment control (first resonance wavelength adjustment control) to adjust the resonance wavelength of the first ring optical modulator 9 to the wavelength of the inputted laser light (step S50). In particular, while the light output (optical output; light power; optical power; light intensity) detected by the photodetector 18 is monitored, the controller 3 controls the heater driving circuit 17 (which may include a heater power supply) to adjust the current amount to be supplied to the resonance wavelength adjustment electrode 8 provided in the first ring optical modulator 9 thereby to perform control to adjust the resonance wavelength of the first ring optical modulator 9 to the wavelength of the inputted laser light. In the present embodiment, since the through port at the opposite side to the light source 1 side of the first optical waveguide 4 is used as the output port and the photodetector 18 side of the second optical waveguide 5 is used as the drop port, the current amount to be supplied to the resonance wavelength adjustment electrode 8 provided in the first ring optical modulator 9 is adjusted so that the light output detected by the photodetector 18 coupled to the drop port becomes maximum in a state in which the modulation electric signal is not supplied to the modulation electrode 7 of the first ring optical modulator 9. In this manner, the current amount (current value) required for adjusting the resonance wavelength of the ring optical modulator 9 to the wavelength of the inputted laser light relating to the first ring optical modulator 9 is acquired.

It is to be noted that, for example, where the application voltage V to the modulation electrode 7 of the ring optical modulator 9 is set to 0 V and −Von and the resonance condition is satisfied when the application voltage V to the modulation electrode 7 of the ring optical modulator 9 is 0 V, namely, where the resonance wavelength of the ring optical modulator is set so as to coincide with the wavelength of the input light when the application voltage V is 0

V, an inverted signal (light intensity modulation signal) obtained by inverting the inputted modulation electric signal is outputted from the through port that serves as the output port of the optical modulation unit 2 [refer to FIGS. 8A and 8C]. Therefore, a signal maybe inverted to obtain the non-inverted signal by signal processing (for example, the signal is passed through an inverter or the like) in the reception system in which a signal is inverted upon decoding or the like. Or, the modulation electric signal may be inverted in advance, for example, by passing the signal through the inverter or the like such that the inversed modulation electric signal is applied to the modulation electrode 7 of the ring optical modulator 9. For example, the application voltage V to the modulation electrode 7 of the ring optical modulator 9 may be set to 0 V and −Von such that the resonance condition is satisfied when the application voltage V to the modulation electrode 7 of the ring optical modulator 9 is −Von, namely, such that the resonance wavelength of the ring optical modulator coincides with the wavelength of the input light when the application voltage V is −Von. In this case, the non-inverted signal is outputted from the through port that serves as the output port of the optical modulation unit 2. Further, for example, the application voltage V to the modulation electrode 7 of the ring optical modulator 9 may be set to 0 V and +Von, and the current amount to be supplied to the resonance wavelength adjustment electrode 8 provided in the ring optical modulator 9 may be adjusted so that, in a state in which the modulation electric signal is not supplied to the modulation electrode 7 of the ring optical modulator 9, the light output detected by the photodetector 18 coupled to the drop port becomes maximum (so that the resonance condition is satisfied when the application voltage V to the modulation electrode 7 of the ring optical modulator 9 is 0 V, namely, so that the resonance wavelength of the ring optical modulator coincides with the wavelength of the input light when the application voltage V is 0 V). In this case, the no-inverted signal is outputted from the through port that serves as the output port of the optical modulation unit 2. Further, where the application voltage V to the modulation electrode 7 of the ring optical modulator 9 is set to 0 V and −Von, the current amount to be supplied to the resonance wavelength adjustment electrode 8 provided in the ring optical modulator 9 may be adjusted so that, in a state in which the modulation electric signal is not supplied to the modulation electrode 7 of the ring optical modulator 9, the light output detected by the photodetector 18 coupled to the drop port becomes maximum, whereafter the current amount to be supplied to the resonance wavelength adjustment electrode 8 is offset. In particular, the current amount to be supplied to the resonance wavelength adjustment electrode 8 is adjusted such that the optical signal propagated to the drop port when the application voltage V to the modulation electrode 7 of the ring optical modulator 9 is 0 V whereas the optical signal propagates to the through port when the application voltage V is −Von. Thereafter, the current amount (resonance wavelength controlling amount by the heater) to be supplied to the resonance wavelength adjustment electrode 8 is offset so that the optical signal propagates to the through port when the application voltage V to the modulation electrode 7 of the ring optical modulator 9 is 0 V whereas the optical signal propagates to the drop port when the application voltage V is −Von.

Then, the controller 3 acquires, with regard to the first ring optical modulator 9, power consumption (power consumption amount) $P_1$ required for adjusting the resonance wavelength of the ring optical modulator 9 to the wavelength of the inputted laser light based on the current amount acquired in such a manner as described above (step S60).

Then, the controller 3 decides whether or not the flag i indicates "N" (step S70). Since the flag i does not indicate "N" at this stage, the processing advances to step S80, at which the flag i is incremented, namely, "1" is added to the value of the flag i, and then the processing returns to step S40.

Then, in order to perform the resonance wavelength adjustment control for the second ring optical modulator 9, the controller 3 performs a process similar to that of the resonance wavelength adjustment control for the first ring optical modulator 9 described above (refer to steps S40 to S60), and acquires, with regard to the second ring optical modulator 9, power consumption $P_2$ required for adjusting the resonance wavelength of the ring optical modulator 9 to the wavelength of the inputted laser light.

Thereafter, a similar process is repetitively performed until it is decided at step S70 that the flag i indicates "N" to acquire, with regard to all of the ring optical modulators 9, namely, with regard to the first to Nth ring optical modulators 9, power consumption $P_i$ to $P_N$ required for adjusting the resonance wavelength of the ring optical modulator 9 to the wavelength of the inputted laser light.

Thereafter, if it is decided at step S70 that the flag i indicates "N", then the processing advances to step S90, at which the controller 3 compares the values of the power consumption $P_i$ to $P_N$ with regard to all of the ring optical modulators 9, namely, with regard to the first to Nth ring optical modulators 9, acquired in such a manner as just described with each other to specify a minimum one of the values of the power consumption $P_1$ to $P_N$ thereby to specify the ring optical modulator 9 having the minimum power consumption (step S100). Here, the ring optical modulator 9 specified as a ring optical modulator 9 having the minimum power consumption is assumed to be the xth ring optical modulator 9. It is to be noted here that, while the ring optical modulator 9 having the minimum power consumption is specified using the power consumption, the present controlling method is not limited to this, and the ring optical modulator 9 having the minimum current amount may be specified using the current amount.

Then, the controller 3 performs the resonance wavelength adjustment control (second resonance wavelength adjustment control) again for the xth ring optical modulator 9 that is the ring optical modulator specified as a ring optical modulator having the minimum power consumption in such a manner as described above.

In particular, the controller 3 changes over the resonance wavelength adjustment switch (first switch) 16 connected to the xth ring optical modulator 9 into an on state and changes over the resonance wavelength adjustment switches (first switch) 16 connected to the remaining ring optical modulators 9 to an off state (step S110).

Then, the controller 3 performs the resonance wavelength adjustment control (second resonance wavelength adjustment control) to adjust the resonance wavelength of the xth ring optical modulator 9 to the wavelength of the inputted laser light (step S120). In particular, the controller 3 controls the heater driving circuit 17 (which may include a heater power supply) while the light output detected by the photodetector 18 is monitored and adjusts the current amount to be supplied to the resonance wavelength adjustment electrode 8 provided in the xth ring optical modulator 9 thereby to perform the control to adjust the resonance wavelength of the xth ring optical modulator 9 to the wavelength of the inputted laser light. In the present embodiment, since the through port at the opposite side to the light source 1 side of the first optical waveguide 4 is used as the output port and the photodetector 18 side of the second optical waveguide 5 is used as the drop port, the current amount to be supplied to the resonance wavelength adjustment electrode 8 provided in the xth ring optical modulator 9 is adjusted so that, in a state in which the modulation electric signal is not supplied to the modulation electrode 7 of the xth ring optical modulator 9, the light output detected by the photodetector 18 coupled to the drop port becomes maximum.

It is to be noted here that, while the current amount to be supplied to the resonance wavelength adjustment electrode 8 provided in the xth ring optical modulator 9 is adjusted, as the second resonance wavelength adjustment control for the xth ring optical modulator 9, so that the light output detected by the photodetector 18 becomes maximum while the light output detected by the photodetector 18 is monitored again, the controlling method is not limited to this. For example, since the current amount required for adjusting the resonance wavelength of the ring optical modulator 9 to the wavelength of the inputted laser light is acquired with regard to the xth ring optical modulator 9 as described above, current may be supplied to the resonance wavelength adjustment electrode 8 provided in the xth ring optical modulator 9 using the current amount to perform the second resonance wavelength adjustment control for the xth ring optical modulator 9.

In this manner, regarding which one of the plurality of ring optical modulators 9 is used optimally from a point of view of the power consumption, an optimum ring optical modulator 9 can be specified by matching the resonance wavelength of the ring optical modulator 9 with the wavelength of the laser light while monitoring the light output by the photodetector 18 and comparing the power consumption (wavelength controlling powers) required for the wavelength matching in all of the ring optical modulators 9 with each other.

It is to be noted that, while the controller 3 in the present embodiment performs the resonance wavelength adjustment control (first resonance wavelength adjustment control) to adjust the resonance wavelength of the ring optical modulator 9 to that of the inputted light having one wavelength individually for the plurality of ring optical modulators 9 provided in the optical modulation unit 2 and specifies a ring optical modulator 9 whose current amount required for adjusting the resonance wavelength of the ring optical modulator 9 to that of the inputted light having one wavelength is minimum from among the plurality of ring optical modulators 9, the specification of a ring optical modulator is not limited to this. For example, the resonance wavelength adjustment control (first resonance wavelength adjustment control) for adjusting the resonance wavelength of the ring optical modulator 9 to that of the inputted light having one wavelength may be performed for at least one of the plurality of ring optical modulators 9 provided in the optical modulation unit 2 such that the ring optical modulator 9 whose current amount required for adjusting the resonance wavelength of the ring optical modulator 9 to that of the inputted light having one wavelength is minimum is specified from among the plurality of ring optical modulators 9.

For example, the resonance wavelength adjustment control (first resonance wavelength adjustment control) to adjust the resonance wavelength of the ring optical modulator 9 to that of the inputted light having one wavelength is performed for one of the plurality of ring optical modulators 9. Consequently, with regard to the one ring optical modulator 9, the current amount (current value) required for adjusting the resonance wavelength of the ring optical modulator 9 to the wavelength of the inputted laser light is acquired. Then, the power consumption required for adjusting the resonance wavelength of the ring optical modulator 9 to the wavelength of the inputted laser light is acquired with regard to the one ring optical modulator 9 based on the acquired current amount. Then, the ring optical modulator 9 whose current amount required for adjusting the resonance wavelength of the ring optical modulator 9 to that of the inputted light having one wavelength is minimum may be specified from among the plurality of ring optical modulators 9 using the acquired power consumption. In this case, the mutual intervals between the resonance wavelengths of the ring optical modulators 9 are known in advance and the power consumption required for shifting the resonance wavelength of the ring optical modulator 9 by the FSR is acquired in advance. Therefore, the power consumption required for shifting the resonance wavelength of the ring optical modulator 9 by the FSR is grasped at a stage of device design, or the resonance wavelength of a certain ring optical modulator is successively shifted actually until it crosses a peak, which appears during the shifting, two times thereby to acquire the power consumption required for shifting the resonance wavelength of the ring optical modulator 9 by the FSR in advance. Then, the ring optical modulator 9 whose current amount required for adjusting the resonance wavelength of the ring optical modulator 9 to that of the inputted light having one wavelength is minimum is estimated from among the plurality of ring optical modulators 9 based on the power consumption acquired with regard to the one ring optical modulator 9.

Accordingly, with the optical modulation apparatus, optical transmitter and controlling method for an optical modulator according to the present embodiment, there is an advantage that the power consumption necessary for adjusting the resonance wavelength of the ring optical modulator 9 to the wavelength of the input light can be suppressed low.

Second Embodiment

First, an optical modulation apparatus, an optical transmitter and a controlling method for an optical modulator according to a second embodiment are described with reference to FIGS. 12 to 14B.

The optical modulation apparatus, optical transmitter and controlling method for an optical modulator according to the present embodiment are different from those of the first embodiment described above in the adjustment method for the resonance wavelength of the ring optical modulator 9. In particular, the optical modulation apparatus, optical transmitter and controlling method for an optical modulator according to the present embodiment are different from those of the first embodiment described hereinabove in that, while the resonance wavelength of the ring optical modulator 9 in the first embodiment is adjusted by heating using the heater, the resonance wavelength of the ring optical modulator 9 in the present embodiment is adjusted by carrier injection.

Therefore, while the heater electrode 8X for heating the ring optical waveguide 6 in the first embodiment described above is provided as the resonance wavelength adjustment electrode 8, in the present embodiment, a carrier injection electrode 8Y to which current is supplied for adjusting the resonance wavelength of the ring optical modulator 9 and which injects carriers into the ring optical waveguide 6 is provided as the resonance wavelength adjustment electrode 8 as depicted in FIGS. 12 to 14B.

Further, by supplying current to the carrier injection electrode 8Y, carriers can be injected into a junction portion 12PN of a different conductive type formed in the inside of the ring optical waveguide 6 thereby to vary the refractive index of the junction portion, and, as a result, the resonance wavelength of the ring optical modulator 9 can be adjusted. Here, if current is supplied to the carrier injection electrode 8Y, then carriers are injected into the pn junction portion 12PN formed in the inside of the ring optical waveguide 6 and the refractive index of the junction portion is varied by the carrier plasma effect to shift the resonance wavelength of the ring optical modulator 9 to the short wavelength side. It is to be noted that the carrier injection is performed by biasing the pn junction portion 12PN in the forward direction.

Since the refractive index variation by such carrier injection as described above is superior in power efficiency in comparison with the refractive index variation by the heater, an effect can be expected that the power required for matching between the wavelength of the input light and the resonance wavelength of the ring optical modulator 9 is further reduced. On the other hand, since increase of optical loss by the carrier injection occurs, the loss from which the input light suffers increases. Further, since part of the modulation region of the ring optical modulator 9 is used as a resonance wavelength adjustment region by the carrier injection, the modulation region decreases and the modulation efficiency drops. Therefore, in comparison with the first embodiment described above, the dynamic extinction ratio decreases with respect to an equivalent modulation signal amplitude.

Since which one of such a configuration according to the first embodiment as described above and such a configuration according to the second embodiment as described above is more preferable depends upon the performance of the laser light source 1, required power consumption of the system, loss in an optical link of the transmission system, configuration and characteristic of the reception system and the like, it is desirable to examine a use environment, a required performance and so forth and select a comparatively advantageous method.

Figure 14B:
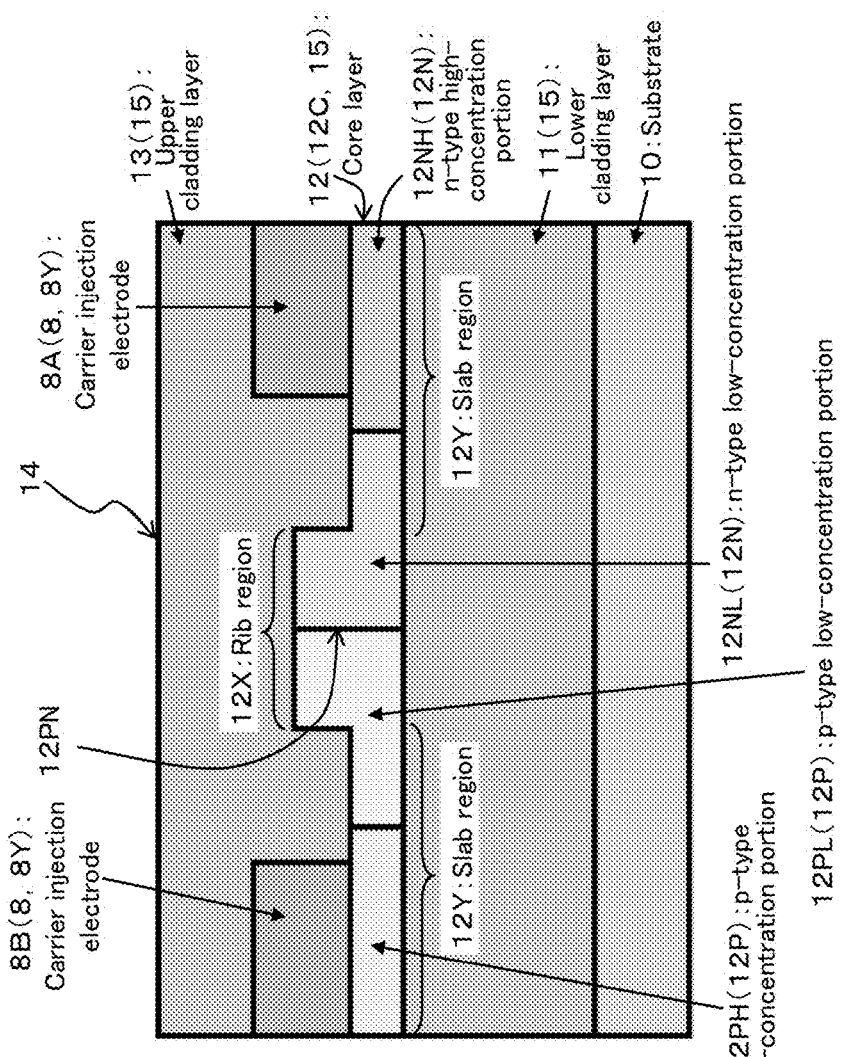
Figure 14A:
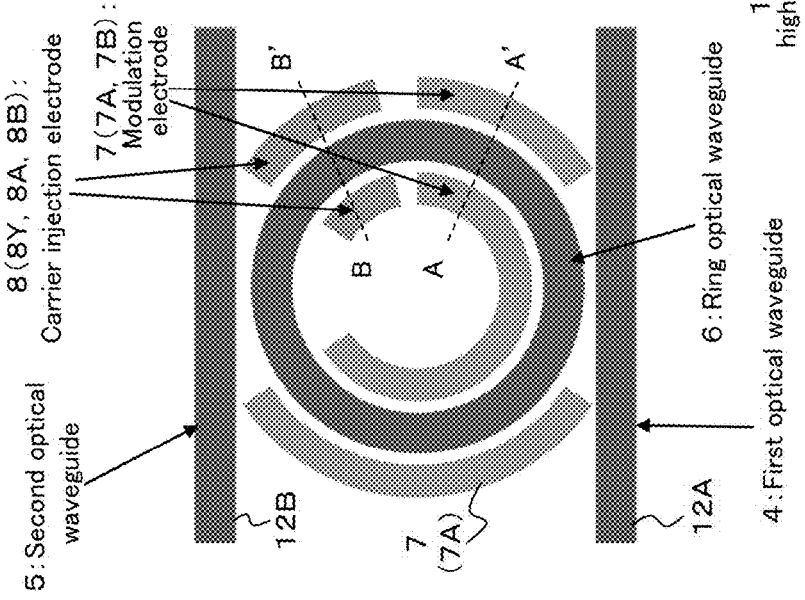

In this case, the p-side electrode 7B and the n-side electrode 7A configuring the modulation electrode 7 may be configured shorter than those of the first embodiment described above and the p-side electrode 8B and the n-side electrode 8A configuring the carrier injection electrode 8Y may be provided in a neighboring relationship with the electrodes 7A and 7B as depicted in FIGS. 14A and 14B. In particular, a portion of the modulation region in which the modulation electrode 7 in the first embodiment described above is provided may be used as the resonance wavelength adjustment region (resonance wavelength controlling region) in which the carrier injection electrode 8Y is provided. It is to be noted that FIG. 14B is a sectional view taken along line B-B' of FIG. 14A, and the sectional view taken along line A-A' of FIG. 14A indicates a structure in which the heater electrode 8X is not provided in FIG. 3B.

Here, the n-side electrode 7A configuring the modulation electrode 7 and the n-side electrode 8A configuring the carrier injection electrode 8Y are provided along the rib region 12X on the high doped region 12NH of the n-type doping region 12N of each ring waveguide core layer 12C, namely, in one of the outer side regions of the slab region 12Y. Further, the p-side electrode 7B configuring the modulation electrode 7 and the p-side electrode 8B configuring the carrier injection electrode 8Y are provided along the rib region 12X on the high doping region 12PH of the p-type doped region 12P of each ring waveguide core layer 12C, namely, in the other one of the outer side regions of the slab region 12Y. In particular, the n-side electrode 7A and the p-side electrode 7B configuring the modulation electrode 7 and the n-side electrode 8A and the p-side electrode 8B configuring the carrier injection electrode 8Y are provided along the rib portion 12Y on both sides (outer side and inner side) across the rib region 12X of each ring waveguide core layer 12C. Here, the p-side electrode 7B configuring the modulation electrode 7 and the p-side electrode 8B configuring the carrier injection electrode 8Y are provided partially at the inner side of the ring-shaped rib region 12X configuring each ring waveguide core layer 12C, and the n-side electrode 7A configuring the modulation electrode 7 and the n-side electrode 8A configuring the carrier injection electrode 8Y are provided partially at the outer side of the ring-shaped rib region 12X.

The carrier injection electrodes 8Y as the resonance wavelength adjustment electrodes 8 of each ring optical modulator 9 may be connected to the carrier injection circuit 21 through the resonance wavelength adjustment switch 16. It is to be noted that the carrier injection circuit 21 maybe configured including a carrier injection power supply or may be configured so as to be connected to the carrier injection power supply provided separately. One ring optical modulator 9 may be selected by switching on one of the resonance wavelength adjustment switches 16 and switching off the remaining resonance wavelength adjustment switches 16. Further, the resonance wavelength adjustment control to adjust the resonance wavelength of the selected ring optical modulator 9 to the wavelength of the input light may be performed by supplying current to the resonance wavelength adjustment electrode 8 of the selected ring optical modulator 9 through the carrier injection circuit 21.

Further, the controller 3 maybe configured such that it performs the control for the resonance wavelength adjustment switch 16 or the carrier injection circuit 21 (which may include the carrier injection power supply) in order to perform the resonance wavelength adjustment control and performs the control for the modulation driving switch 19 or the driver circuit 20 (which may include the modulation signal source) in order to perform the modulation driving control. Further, similarly as in the first embodiment described above, the controller 3 may be configured such that it performs the resonance wavelength adjustment control (first resonance wavelength adjustment control) to adjust the resonance wavelength of the ring optical modulator 9 to that of the light having one wavelength and inputted from the light source 1 to specify the ring optical modulator 9 whose current amount required for adjusting the resonance wavelength of the ring optical modulator 9 to the one wavelength of the input light is minimum from among the plurality of ring optical modulators 9. Further, the controller 3 may be configured such that it performs the resonance wavelength adjustment control (second resonance wavelength adjustment control) to adjust the resonance wavelength of the specified ring optical modulator 9 to the one wavelength of the input light to perform the modulation driving control using the specified ring optical modulator 9.

It is to be noted that the configuration, fabrication method and so forth of the other part are similar to those in the first embodiment described above.

Accordingly, with the optical modulation apparatus, optical transmitter and controlling method for the optical modulator according to the present embodiment, there is an advantage that the power consumption required for adjusting the resonance wavelength of the ring optical modulator 9 to the wavelength of the input light can be suppressed low similarly as in the first embodiment described above.

Third Embodiment

First, an optical modulation apparatus, an optical transmitter and a controlling method for an optical modulator according to a third embodiment are described with reference to FIGS. 15, 16A to 16C.

Figure 15:
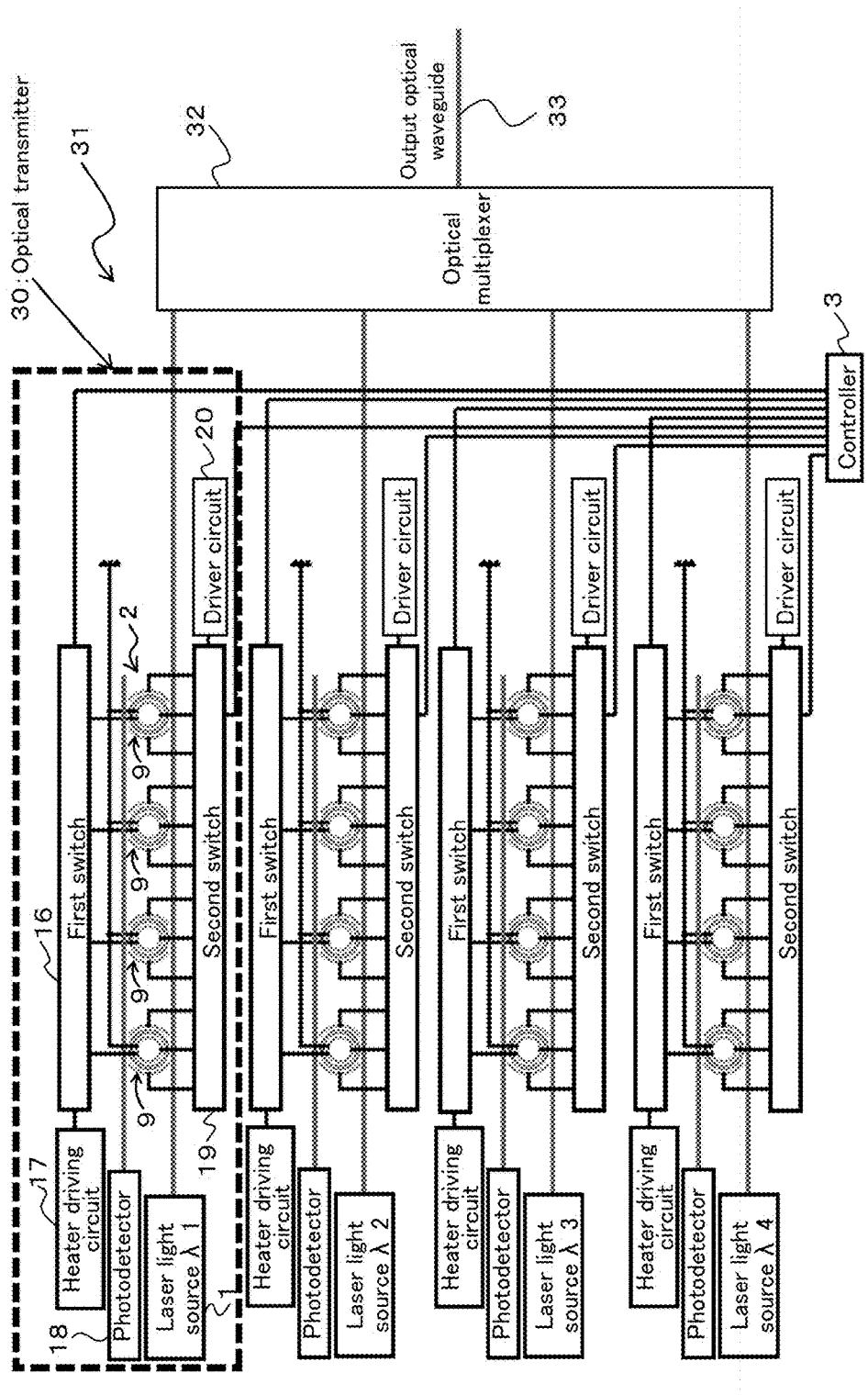
FIG. 15 is a schematic view depicting a configuration of an optical modulation apparatus and an optical transmitter according to a third embodiment.

The optical modulation apparatus and the optical transmitter according to the present embodiment are different in that light having a plurality of wavelengths different from each other are modulated and the modulated optical signals are multiplexed and outputted. Therefore, as depicted in FIG. 15, the optical transmitter according to the present embodiment is a wavelength division multiplexing (WDM) optical transmitter 31 including a plurality of (here, four) optical transmitters 30 of the first embodiment described above. Further, the optical modulation apparatus according to the present embodiment is a wavelength division multiplexing optical modulation apparatus including a plurality of (here, four) optical modulation apparatus of the first embodiment described above. Further, the controlling method for an optical modulator according to the present embodiment is similar to that of the first embodiment described above.

The above-described optical transmitter 30 of the present embodiment provided in the WDM optical transmitter 31 according to the present embodiment, namely, the plurality of optical transmitters 30, include a plurality of light sources 1 (here, laser light sources) which output light having wavelengths (here, A1 to A4) different from each other. Further, the optical modulation units 2 included in the plurality of optical transmitters 30 are coupled one by one to the plurality of light sources 1. Further, in the optical modulation unit 2 included individually in the plurality of optical transmitters 30, the round-trip length (or the ring radius) of the ring optical waveguide 6 of the ring optical modulator 9 provided in the optical modulation unit 2 is determined based on the wavelength of the inputted light, namely, based on the wavelength of light outputted from the light source 1 provided in each of the optical transmitters 30. Further, the controller 3 performs the resonance wavelength adjustment control (first resonance wavelength adjustment control) to adjust the resonance wavelength of the ring optical modulator 9 to one input light wavelength inputted from the light source 1 for each of the plurality of optical modulation units 2 to specify the ring optical modulator 9 whose current amount required for adjusting the resonance wavelength of the ring optical modulator 9 to the one input light wavelength is minimum from among the plurality of ring optical modulators 9. Then, the controller 3 performs the resonance wavelength adjustment control (second resonance wavelength adjustment control) to adjust the resonance wavelength of the specified ring optical modulator 9 to the one input light wavelength to perform the modulation driving control using the specified ring optical modulator 9. Consequently, the light outputted from each of the plurality of light sources 1 is modulated by the corresponding optical modulation unit 2 using the specified ring optical modulator 9.

The plurality of optical transmitters 30 (optical modulation apparatus), namely, the optical modulation units 2 provided in the optical transmitters 30, are coupled to an optical multiplexer (optical multiplexing unit) 32, and one output optical waveguide 33 is coupled to the optical multiplexer 32. Consequently, signal light (modulation light) of the wavelengths different from each other outputted from the plurality of optical transmitters 30 (optical modulation apparatus) are multiplexed by the optical multiplexer 32 and outputted as WDM signal light from the output optical waveguide 33. Here, the optical multiplexer 32 is coupled to the opposite side to the laser light sources 1 side of the first optical waveguides 4 provided in the plurality of transmitters 30. Here, as the optical multiplexer 32, for example, a combination of ring resonators, an array waveguide type grating, or a delay Mach-Zehnder interferometer can be used.

It is to be noted that the configuration, the fabrication method and so forth of the other part are similar to those of the first embodiment described above.

Accordingly, with the optical modulation apparatus, optical transmitter and controlling method for an optical modulator according to the present embodiment, there is an advantage that the power consumption required for adjusting the resonance wavelength of the ring optical modulator 9 to the wavelength of the input light can be suppressed low similarly as in the first embodiment described above.

Particularly, in the WDM optical transmitter 31 according to the present embodiment, also there is an advantage that the inputted light having one wavelength can be modulated in stability and with certainty with low power consumption using the specified ring optical modulator 9 from among the plurality of ring optical modulators 9. In particular, also there is an advantage that, for example, even if the wavelength of the input light (namely, the wavelength of the laser light inputted from the laser light source 1) is displaced, the modulation can be performed in stability and with certainty with low power consumption using the specified ring optical modulator 9 from among the plurality of ring optical modulators 9.

Figure 16A:
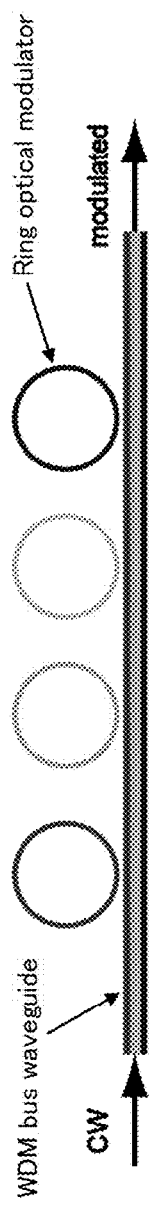
FIGS. 16A to 16C are views illustrating a configuration and a subject of a WDM optical transmitter of a comparative example.
Figure 16B:
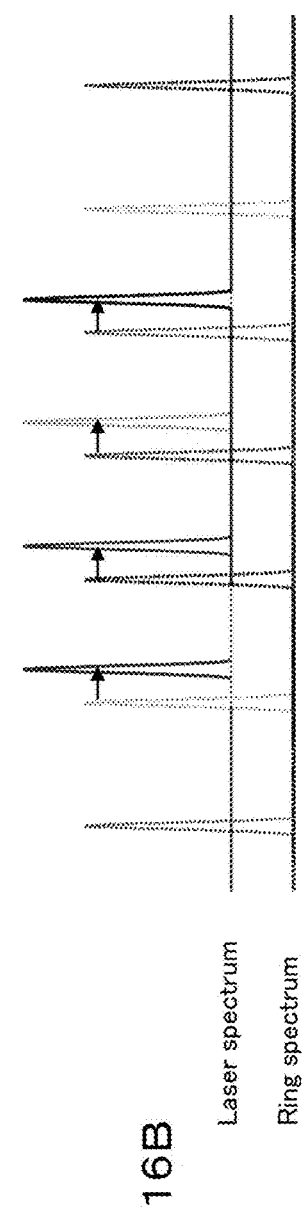
Figure 16C:
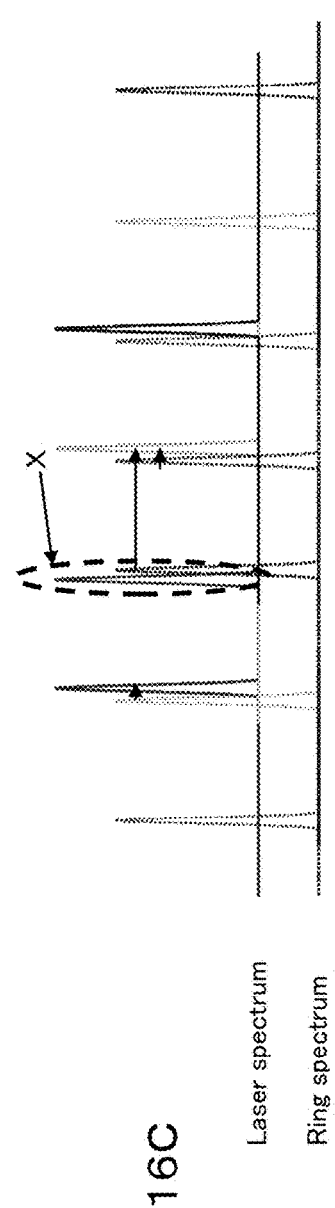

On the other hand, it seems a possible idea to configure the WDM optical transmitter such that, for example, CW (Continuous Wave)-WDM input light obtained in advance by multiplexing the input light (continuous light; laser light) having a plurality of wavelengths different from each other is inputted to a WDM bus waveguide in which a plurality of ring optical modulators are coupled in cascade and input light having wavelengths included in the CW-WDM input light are modulated individually by the ring optical modulators and outputted as WDM signal light as depicted in FIG. 16A. Further, it seems a possible idea to adjust, in such a WDM optical transmitter as just described, the resonance wavelength of each of the plurality of ring optical modulators to the wavelength of the input light having the nearest wavelength thereby to reduce the power consumption required for the adjustment as indicated by arrow marks in FIG. 16B. However, although there is no problem if the spectra of the laser light having the plurality of wavelengths different from each other, namely, the wavelengths of the input light, and the spectra of the resonance wavelengths of the plurality of ring optical modulators, namely, the resonance wavelengths of the plurality of ring optical modulators, have such an ideal relationship to each other as depicted in FIG. 16B, if the wavelength of the input light is displaced, for example, as depicted in FIG. 16C, then where the resonance wavelengths of the plurality of ring optical modulators are adjusted to the wavelengths of the input light as indicated by an arrow mark in FIG. 16C, a ring optical modulator to be used for modulation of input light (enclosed by a circle indicated by reference character X in FIG. 16C) having a certain wavelength may not exist anymore or input light having one wavelength may be modulated by two ring optical modulators. In this case, it is difficult to perform the modulation in stability and with certainty.

It is to be noted that, while the configuration that the plurality of optical transmitters 30 of the first embodiment described above are provided is applied in the embodiment described above, the configuration is not limited to this, and, for example, also it is possible to adopt another configuration that a plurality of optical transmitters of the second embodiment described above are included.

[Others]

It is to be noted that the present invention is not limited to the configurations of the embodiments and the modifications described above, and variations and modifications can be made without departing from the scope of the present invention.

Figure 17:
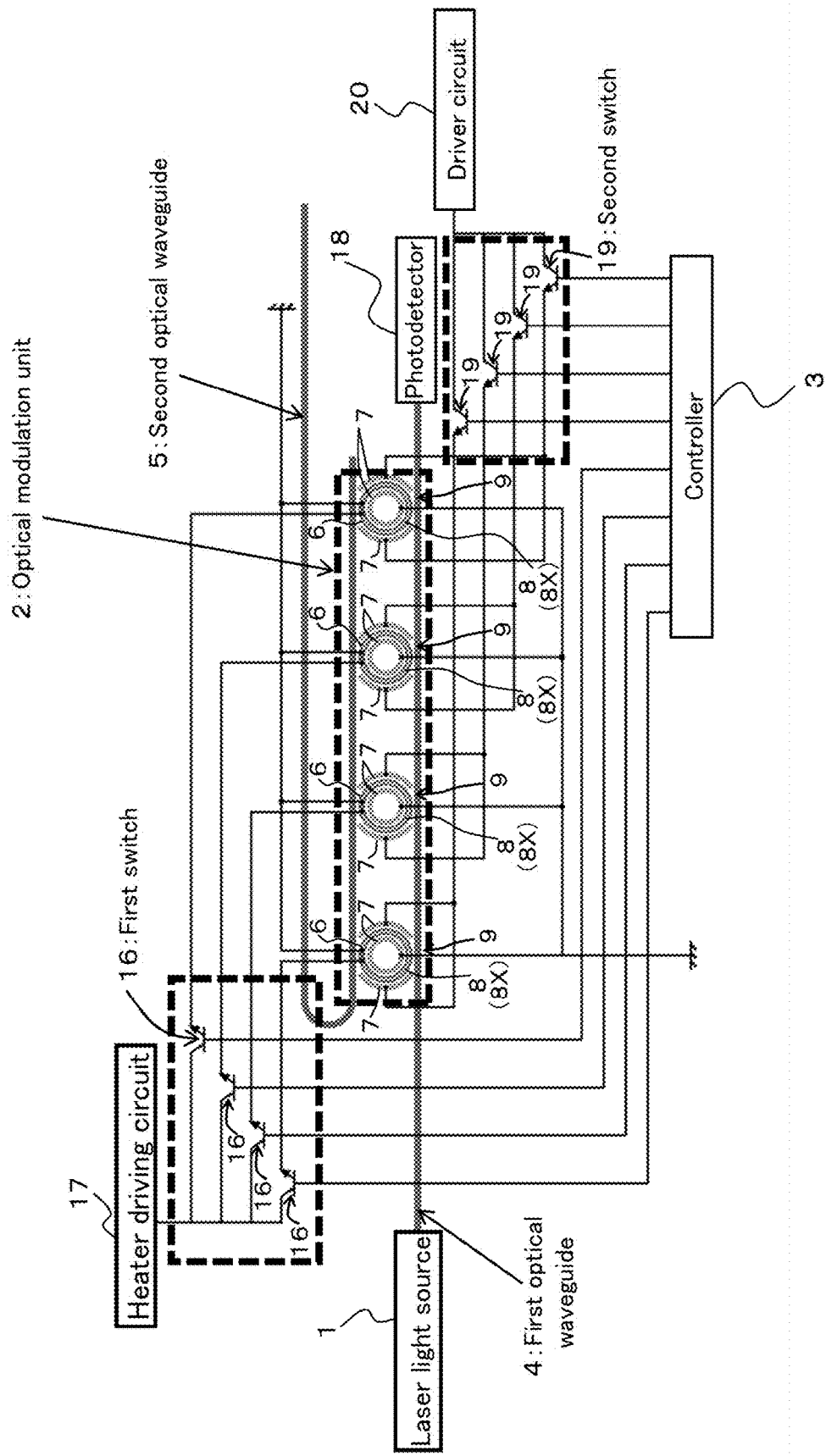
FIG. 17 is a schematic view depicting a configuration of a modification to the optical modulation apparatus and the optical transmitter according to the embodiments.

For example, while the photodetector 18 in the first embodiment described above is coupled to the drop port of the optical modulation unit 2, namely, to the second optical waveguide 5, the present invention is not limited to this. For example, the photodetector 18 maybe coupled to the through port of the optical modulation unit 2, namely, to the opposite side to the light source 1 side of the first optical waveguide 4, as depicted in FIG. 17. Also in this case, similar effects to those of the first embodiment described above are obtained. In this case, since light passing through the ring optical modulators 9 are inputted to the photodetector 18, the current amount to be supplied to the resonance wavelength adjustment electrode 8 provided in each ring optical modulator 9 is adjusted so that the light output detected by the photodetector 18 becomes minimum when the resonance wavelength adjustment control to adjust the resonance wavelength of the ring optical modulator 9 to the wavelength of the input light is performed. It is to be noted that, for example, where the application voltage V to the modulation electrode 7 of the ring optical modulator 9 is set to 0 V and −Von and the resonance condition is satisfied when the application voltage V to the modulation electrode 7 of the ring optical modulator 9 is 0 V, namely, the resonance wavelength of the ring optical modulator coincides with the wavelength of the input light when the application voltage V is 0 V, the non-inverted signal with respect to the inputted modulation electric signal is outputted from the drop port that is the output port of the optical modulation unit 2. Further, for example, where the application voltage V to the modulation electrode 7 of the ring optical modulator 9 is set to 0 V and −Von and the resonance condition is satisfied when the application voltage V to the modulation electrode 7 of the ring optical modulator 9 is −Von, namely, the resonance wavelength of the ring optical modulator coincides with the wavelength of the input light when the application voltage V is −Von, or where the application voltage V to the modulation electrode 7 of the ring optical modulator 9 is set to 0 V and +Von and the resonance condition is satisfied when the application voltage V to the modulation electrode 7 of the ring optical modulator 9 is 0 V, namely, the resonance wavelength of the ring optical modulator coincides with the wavelength of the input light when the application voltage V is 0 V, the inverted signal obtained by inverting the inputted modulation electric signal may be outputted from the drop port that serves as the output port of the optical modulation unit 2. Similarly as in the first embodiment described above, a signal may be inverted by signal processing in the reception system to obtain the non-inverted signal or the current amount to be supplied to the resonance wavelength adjustment electrode 8 may be offset after the current amount to be supplied to the resonance wavelength adjustment electrode 8 is adjusted. Further, while the configuration mentioned just above is described here as a modification to the first embodiment described above, the modification can be applied also to the second embodiment or the third embodiment described above.

Further, while, in the embodiments described above, silicon is used as a material for the waveguide core layer configuring the optical waveguide provided in the optical modulation unit 2 and $SiO_2$ is used as a material for the cladding layer, the materials are not limited to them. For example, a different semiconductor material such as silicon germanium, InP, GaAs, a mixture of the materials or the like, namely, a different semiconductor material transparent with respect to signal light of a communication wavelength band, may be used, and, also in this case, similar effects to those of the embodiments described above are achieved.

Further, while a silicon substrate (Si substrate) is used for the substrate 10 in the embodiments described above, the material for the substrate 10 is not limited to this. For example, a different material such as quartz, GaAs, InP or the like may be used for the substrate, and, also in this case, similar effects to those of the embodiments described above are achieved.

Further, while, in the embodiments described above, the ring optical modulator 9 has a horizontal pn structure such that carrier density variation upon reverse biasing is used, the ring optical modulator 9 is not limited to this. For example, the horizontal pin structure may be used such that carrier density variation upon forward biasing is utilized, and, also in this case, similar effects to those of the embodiments described above are obtained.

Further, while the ring optical waveguide 6 of the ring optical modulator 9 in the embodiments described above is configured so as to have a circular ring shape, the ring optical waveguide 6 is not limited to this. For example, a ring optical waveguide of a race track type may be applied in which a coupling portion between the first optical waveguide and the second optical waveguide (input and output waveguide) is formed linearly, and, also in this case, similar effects to those of the embodiments described above are achieved.

Further, while the rib waveguide structure is applied as the waveguide structure in the embodiments described above, the waveguide structure is not limited to this. For example, part or the entirety of the waveguide maybe configured from a channel-type waveguide structure which does not have a slab region, and, also in this case, similar effects to those of the embodiments described above are achieved.

Further, while the photodetector 18 in the embodiments described above is configured from a pin type photodetector having an InGaAs absorption layer or a Ge absorption layer, the present invention is not limited to this. For example, the absorption layer may be configured as a layer for absorbing a signal wavelength and not only the materials just described but also a different material such as, for example, InGaAsP can be used, and, also in this case, similar effects to those of the embodiments described above are achieved. Further, also a structure other than the pin type structure may be applied as the structure of the photodetector 18 and a different structure such as, for example, an APD (Avalanche Photo-Diode) type structure or an MIM (Metal-Insulator-Metal) type structure may be applied, and, also in this case, similar effects to those of the embodiments described above are achieved.

Further, while the embodiments are described above taking, as an example, a case in which the DFB laser is used as the laser light source 1, the laser light source is not limited to this. For example, a distributed Bragg reflection (DBR) laser or an external resonator type laser may be used, and, also in this case, similar effects to those of the embodiments described above are achieved.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter, comprising:
    a light source that outputs light having one wavelength;
    an optical modulation unit that is coupled to the light source and includes a plurality of ring optical modulators individually including a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the ring optical waveguides of the plurality of ring optical modulators having round-trip lengths different from each other; and
    a controller that performs, for at least one of the plurality of ring optical modulators, first resonance wavelength adjustment control to adjust the resonance wavelength of the ring optical modulator to the one input light wavelength inputted from the light source, performs second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performs modulation driving control by supplying a modulation electric signal to the modulation electrode of the specified ring optical modulator.

2. An optical transmitter, comprising:
    a plurality of light sources that output light having wavelengths different from each other;
    a plurality of optical modulation units that are coupled one by one to the plurality of light sources and individually include a plurality of ring optical modulators individually including a first optical waveguide, a second optical waveguide, a ring optical waveguide optically coupled between the first optical waveguide and the second optical waveguide, a modulation electrode that is provided on the ring optical waveguide and to which a modulation electric signal is supplied, and a resonance wavelength adjustment electrode provided on the ring optical waveguide for adjusting a resonance wavelength, the plurality of ring optical modulators being coupled in cascade to each other, the ring optical waveguides of the plurality of ring optical modulators having round-trip lengths different from each other;
    an optical multiplexer coupled to the plurality of optical modulation units; and
    a controller that performs, for at least one of the plurality of ring optical modulators of each of the plurality of optical modulation units, first resonance wavelength adjustment control to adjust the resonance wavelength of the ring optical modulator to one input light wavelength inputted from one of the light sources, performs second resonance wavelength adjustment control to specify the ring optical modulator that exhibits a minimum current amount required for the adjustment of the resonance wavelength of the ring optical waveguide to the one input light wavelength from among the plurality of ring optical modulators, to supply current to the resonance wavelength adjustment electrode of the specified ring optical modulator, thereby to adjust the resonance wavelength of the specified ring optical modulator to the one input light wavelength, and performs modulation driving control by supplying a modulation electric signal to the modulation electrode of the specified ring optical modulator.

3. The optical transmitter according to claim 2, wherein the resonance wavelength adjustment electrode is a heater electrode to which current is supplied in order to adjust the resonance wavelength of the ring optical modulator to heat the ring optical waveguide.

4. The optical transmitter according to claim 2, wherein the resonance wavelength adjustment electrode is a carrier injection electrode to which current is supplied in order to adjust the resonance wavelength of the ring optical modulator to inject carriers into the ring optical waveguide.

5. The optical transmitter according to claim 2, wherein, in a state in which the modulation electric signal is not supplied to the modulation electrode and current is not supplied to the resonance wavelength adjustment electrode, mutual intervals between the resonance wavelengths of the plurality of ring optical modulators are substantially equal to each other.

6. The optical transmitter according to claim 2, further comprising:
    first switches connected one by one to the resonance wavelength adjustment electrodes of the plurality of ring optical modulators; and
    second switches connected one by one to the modulation electrodes of the plurality of ring optical modulators; wherein
    the controller performs control for changing over the first switches in order to select the ring optical modulator for which the first and second resonance wavelength adjustment controls are to be performed and performs control for changing over the second switches in order to select the ring optical modulator for which the modulation driving control is to be performed.

7. The optical transmitter according to claim 2, further comprising a photodetector coupled to the first optical waveguide or the second optical waveguide; wherein
    the controller performs the first resonance wavelength adjustment control based on information detected by the photodetector.

* * * * *